US006785667B2

(12) United States Patent
Orbanes et al.

(10) Patent No.: US 6,785,667 B2
(45) Date of Patent: Aug. 31, 2004

(54) METHOD AND APPARATUS FOR EXTRACTING DATA OBJECTS AND LOCATING THEM IN VIRTUAL SPACE

(75) Inventors: Julian Orbanes, Cambridge, MA (US); Adriana Guzman, Cambridge, MA (US)

(73) Assignee: GeoPhoenix, Inc., Cambridge, MA (US)

( * ) Notice: Subject to any disclaimer, the term of this patent is extended or adjusted under 35 U.S.C. 154(b) by 266 days.

(21) Appl. No.: 09/783,717

(22) Filed: Feb. 14, 2001

(65) Prior Publication Data

US 2002/0083034 A1 Jun. 27, 2002

Related U.S. Application Data

(60) Provisional application No. 60/182,326, filed on Feb. 14, 2000, provisional application No. 60/182,368, filed on Feb. 14, 2000, provisional application No. 60/240,287, filed on Oct. 13, 2000, and provisional application No. 60/249,417, filed on Nov. 16, 2000.

(51) Int. Cl.[7] .............................................. G06F 17/30
(52) U.S. Cl. .................. 707/1; 707/1; 707/3; 707/100; 707/103 R; 707/104.1; 345/419
(58) Field of Search ............................ 707/1, 3, 104.1, 707/4, 10, 5, 100, 102, 103 R, 204, 205; 345/419, 661, 668, 671, 781, 788, 798, 804, 805, 854; 709/203, 217, 219

(56) References Cited

U.S. PATENT DOCUMENTS

| | | |
|---|---|---|
| 5,073,771 A | 12/1991 | Satta et al. |
| 5,262,761 A | 11/1993 | Scandura et al. |
| 5,321,800 A | 6/1994 | Lesser |
| 5,341,466 A | 8/1994 | Perlin et al. |
| 5,555,354 A | 9/1996 | Strasnick et al. |
| 5,615,384 A | 3/1997 | Allard |
| 5,623,588 A | 4/1997 | Gould |

(List continued on next page.)

FOREIGN PATENT DOCUMENTS

| | | |
|---|---|---|
| JP | 11065430 A2 | 3/1999 |
| WO | 00/57257 | 9/2000 |

OTHER PUBLICATIONS

Del Bimbo et al., "Shape indexing by Structural Properties", Jun. 3–6, 1997, Proceedings of the 1997 IEEE Multimedia Computing and Systems Conference, pp. 370–378.*

(List continued on next page.)

*Primary Examiner*—Shahid Alam
*Assistant Examiner*—Fred Ehichioya

(57) ABSTRACT

The invention provides method and apparatus for viewing information. In one embodiment, the system of the invention enables the user to view displayed information in a way that is comparable to a selected physical paradigm. Example physical paradigms include, but are not limited to, financial, educational, governmental, sports, media, retail, travel, geographic, real estate, medical, physiological, mechanical, surveillance, agricultural, industrial, infrastructure, scientific and other like paradigms. By presenting information to the user in a way that more closely mimics physical paradigms, the system provides an intuitive mechanism for the user to view, search through and interact with displayed information in an unrestricted manner. In another embodiment, the appearance is a graphical representation of one or more data objects, related to other data objects through hierarchical relationships defined by one or more templates. As the user adjusts the viewing perspective, the appearance changes in a seemingly continuous, non-discrete manner.

33 Claims, 21 Drawing Sheets

U.S. PATENT DOCUMENTS

| | | | |
|---|---|---|---|
| 5,623,589 | A | 4/1997 | Needham et al. |
| 5,684,969 | A | 11/1997 | Ishida |
| 5,716,546 | A | 2/1998 | Cox et al. |
| 5,825,998 | A | 10/1998 | Brechner |
| 5,838,326 | A | 11/1998 | Card et al. |
| 5,889,518 | A | 3/1999 | Poreh et al. |
| 5,889,951 | A | 3/1999 | Lombardi et al. |
| 5,903,269 | A | 5/1999 | Poreh et al. |
| 5,912,668 | A | 6/1999 | Sciammarella et al. |
| 5,969,706 | A | 10/1999 | Tanimoto et al. |
| 5,991,776 | A | 11/1999 | Bennett et al. |
| 5,999,177 | A | 12/1999 | Martinez |
| 6,025,844 | A | 2/2000 | Parsons |
| 6,031,537 | A | 2/2000 | Hugh |
| 6,034,661 | A | 3/2000 | Servan-Scheiber et al. |
| 6,037,939 | A | 3/2000 | Kashiwagi et al. |
| 6,037,944 | A | 3/2000 | Hugh |
| 6,040,832 | A | 3/2000 | Poreh et al. |
| 6,043,817 | A | 3/2000 | Bolnick et al. |
| 6,052,110 | A | 4/2000 | Sciammarella et al. |
| 6,061,061 | A | 5/2000 | Conrad et al. |
| 6,122,634 | A | 9/2000 | Brodsky |
| 6,133,914 | A | 10/2000 | Rogers et al. |
| 6,192,393 | B1 | 2/2001 | Tarantino et al. |
| 6,222,547 | B1 * | 4/2001 | Schwuttke et al. ......... 345/419 |
| 6,259,451 | B1 | 7/2001 | Tesler |
| 6,289,354 | B1 | 9/2001 | Aggarwal et al. |
| 6,411,960 | B1 | 6/2002 | Fisher |
| 6,434,564 | B2 | 8/2002 | Ebert |
| 6,449,639 | B1 | 9/2002 | Blumberg |
| 6,505,202 | B1 | 1/2003 | Mosquera et al. |
| 6,513,035 | B1 | 1/2003 | Tanaka et al. |
| 2002/0069215 | A1 | 6/2002 | Orbanes et al. |
| 2002/0075311 | A1 | 6/2002 | Orbanes et al. |
| 2002/0075331 | A1 | 6/2002 | Orbanes et al. |
| 2002/0080177 | A1 | 6/2002 | Orbanes et al. |
| 2002/0085035 | A1 | 7/2002 | Orbanes et al. |
| 2002/0089550 | A1 | 7/2002 | Orbanes et al. |
| 2002/0105537 | A1 | 8/2002 | Orbanes et al. |
| 2002/0109680 | A1 | 8/2002 | Orbanes et al. |

OTHER PUBLICATIONS

Ahmed et al., "Spatial Similarity–based Retrievals and Image Indexing By Hierarchical Decomposition", Aug. 25–27, 1997, Proceedings of the 1997 IEEE Database Engineering and Applications Symposium, pp. 269–278.*

Smith et al., "Visualseek: A fully Automated Content–based Image Query System", 1996, Proceedings of the 1996 ACM Multimedia Conference, pp. 87–98.*

Baig, Edward C. "Touchy mice are ready to rumble," USA Today, Nov. 15, 2000, p. 3D.

Bederson, Benjamin B. et al. "A Zooming Web Browser," 1996 IS&T/SPIE electronic Imaging Science and Technology Symposium–Final Program and Abstracts of Papers, Jan. 27–Feb. 2, 1996.

Holmquist, Lars Eric, Focus+Context Visualization with Flip Zooming and the Zoom Browser Conference on Human Factors in Computing Systems, Mar. 22–27, 1997.

Robertson, George G. et al. "Information Visualization Using 3D Interactive Animation," Communications of the ACM, Apr. 1993, vol. 36, No. 4, pp. 57–71.

Smith, Gareth "Cooperative Virtual Environments: lessons from 2D multi user interfaces," Computer Supported Cooperative Work '96, Nov. 16, 1996, pp. 390–398.

Web site www.cs.umd.edu/hcil/jazz.

Web site www.cs.emd.edu/hcil/pad++.

Web site www8.techmall.com/techdocs/NP970918–5.html.

Web site www.vios.com/about/overview/html.

Web site www.webbrain.com/about.html.

Bo Tao; Dickinson, B. Template–based image retrieval: Image Processing, 1996. Proceedings, International Conference on, vol. 3, Sep. 16–19, 1996; pp. 871–874 vol. 3 copyright IEEE 0–7803–3258–X/96.

Gavrilia, D.M. "Multi–feature hierarchical template matching using distance transforms" Pattern Recognition, 1998. Proceedings. Fourteen International Conference on , vol. 1, Aug. 16–20, 1998.

* cited by examiner

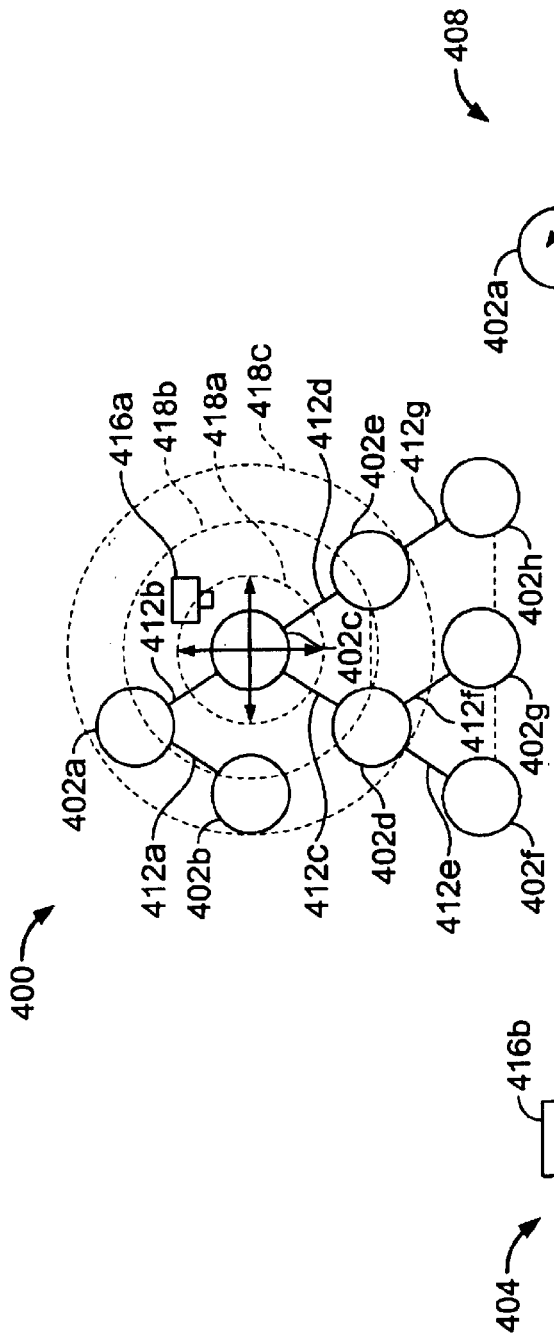
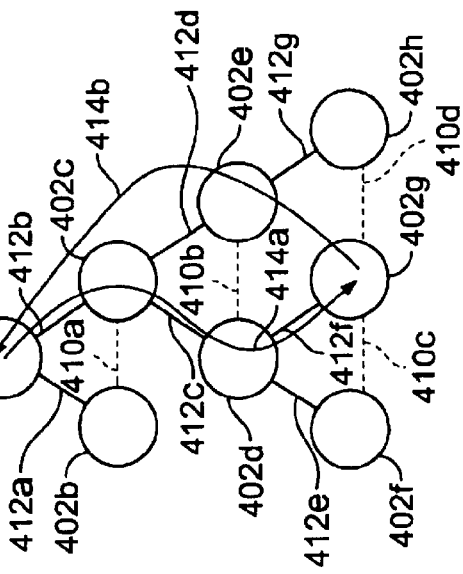
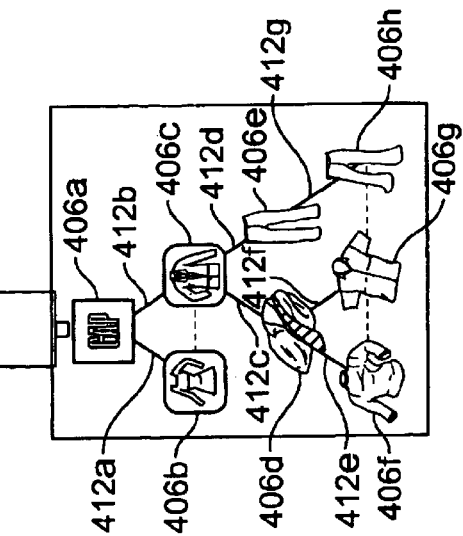
FIG. 4A
FIG. 4B
FIG. 4C

METHOD AND APPARATUS FOR EXTRACTING DATA OBJECTS AND LOCATING THEM IN VIRTUAL SPACE

CROSS REFERENCE TO RELATED APPLICATIONS

This application claims priority to U.S. provisional applications Serial No. 60/182,326, filed Feb. 14, 2000, Serial No. 60/182,368, filed Feb. 14, 2000, Serial No. 60/240,287, filed Oct. 13, 2000 and Serial No. 60/249,4 17, filed Nov. 16, 2000. These co-pending applications are hereby incorporated by reference in their entirety.

FIELD OF THE INVENTION

The invention generally relates to methods and apparatus for viewing information. More particularly, in one embodiment, the invention is directed to a system for enabling the user to view, search through and interact with information through a virtual environment, which is related to a selected physical paradigm, in an unrestricted manner.

BACKGROUND OF THE INVENTION

As computing technology has evolved, users have been able to access increased amounts of information from an ever-expanding universe of data sources. One example of this is the World Wide Web (hereafter, "the Web" or "Web"). Information from a myriad of sources is available to virtually anyone with a device that is connected to a network and capable of "browsing" the latter. A computer connected to the Internet and executing a browser program, such as Microsoft Internet Explorer™ or Netscape Navigator™, is one typical implementation of this.

Computing devices have become smaller and more powerful, thereby providing the user with unprecedented access to desired information when mobile. For example, wireless telephones and personal digital assistants ("PDAs") equipped with wireless modems, when provided with the appropriate software, also permit the user to browse a network and look for information of interest.

Despite these advances in hardware and software, the sheer volume of information available can overwhelm the user. Graphical user interfaces that provide multiple views of related information (such as frames, panes, or screens) are prevalent in commercially available software products. These interfaces tend to facilitate user interaction with information presented. Unfortunately, current multi-view interfaces are severely limited by the lack of intuitive, hierarchical relationships between views, view placement and layout, and view presentation. These related views are typically ad hoc in their interaction and functionality. That is, there is little user level control over the relationships between views, view placement and layout, and view presentation.

The default behavior in a Web browser is to follow a link by replacing the current browser context. The Web page author can change this default behavior on a link-by-link basis. For example, HTML-based frames can be created and targeted programmatically by writing HTML or JAVA™ Script code. However, the user has no way to change the preprogrammed targeting. This statically defined "one-size-fits-all" behavior may be frustrating and problematic in some common browsing scenarios.

An example of the foregoing involves browsing the set of results returned by a search engine. Users typically want to explore several promising sites listed in the page of search results. The typical interaction is to follow a link, look at the page, and then actuate the back button to redisplay the search results. There are disadvantages to this ping-pong approach. First, the user loses context because the search results and followed link are not visible at the same time. Second, the constant switching of contexts requires extra navigation steps.

Another common interaction technique is to use a mouse to right-click on the link, and to choose open in new frame from the context menu. This causes the link to expand in a new frame. One deficiency in this spawning approach is that a large number of temporary frames are explicitly opened and used only briefly before being closed. This problem can be significant when small displays are used, such as those found on wireless telephones and PDAs. In addition, a cumbersome pop-up menu is typically used for each link traversal.

From the foregoing, it is apparent that there is still a need for a way to view large amounts of information in an efficient manner. The information should be arranged using a hierarchy that is intuitive to the user. It should be presented in an interface that is easy to navigate, but does not overwhelm the display device or frustrate the user due to loss of context or an excessive number of navigational steps.

SUMMARY OF THE INVENTION

In addressing the deficiencies of prior systems, the invention provides improved methods and apparatus for viewing information. In one embodiment, the invention provides, from two-dimensional display, a user's viewing perspective of a three-dimensional virtual space in which discrete data objects are located. In a further embodiment, the invention creates an array of vector elements or two-dimensional matrix of pixels for a camera viewing perspective in a three- or more dimensional space of objects. The objects are assigned to coordinates in the virtual space and the visual representation of each data object is a function of the user's viewing perspective in the virtual space. According to one feature, the user controls a virtual camera, and this viewing perspective point has coordinates. According to another feature, the user dynamically controls the viewing perspective with variable velocity and acceleration. The appearance of data objects within the viewing perspective is rendered in the user interface. In one embodiment, the data objects are obtained from crawling data sources. According to one feature, the invention breaks down boundaries between sets of data objects by dividing the sets into smaller subsets and displaying those smaller subsets. According to a further aspect, the invention displays and delivers data as function of space and time. According to one feature, the closer the data is to the user's viewing perspective in virtual space, the sooner it is downloaded for display to the user.

The system relates data objects hierarchically using a spatial paradigm. A spatial paradigm can include abstract, mathematical and physical paradigms. In one embodiment, the invention provides a system that enables the user to view displayed information in a way that is comparable to a selected physical paradigm. Example categories of physical paradigms can include information paradigms, entertainment paradigms, service paradigms and/or transaction paradigms. Example physical paradigms include, but are not limited to, finance, education, government, sports, media, retail, travel, geographic, real estate, medicine, physiology, automotive, mechanical, database, e-commerce, news, engineering, fashioned-based, art-based, music-based, surveillance, agriculture, industry, infrastructure, scientific, anatomy, petroleum industry, inventory, search engines and other like physical paradigms. By presenting information to the user in a way that more closely mimics a physical paradigm, the system provides an intuitive mechanism for the user to view, interact with and operate on displayed information.

According to one embodiment, the system provides a template for a database. The template relates to a physical paradigm, and defines hierarchical relationships between data objects stored in the database. The system profiles data sources and extracts data objects associated with the physical paradigm from at least one of those data sources. Data sources can include, for example, legacy databases, Internet Web servers, substantially real-time data sources, file systems, files, storage devices, simulations, models or the like. Data sources can also include, for example, live information feeds from any source, such as those relating to news, scientific or financial information. A data source can also be an edge server or a distributed cache server for distributing Web content closer to the user. In another embodiment, the system provides a plurality of templates. In a further embodiment, results from a search engine are arranged for the user according to a selected template.

In one embodiment, the system organizes and stores the data objects associated with the physical paradigm in the database according to hierarchical relationships defined by the template. The system displays an appearance of a subset of the data objects associated with the physical paradigm in a virtual representation. To display the appearance, the system employs the selected data objects and the template. According to another feature, the system defines a viewing perspective of the user viewing the virtual representation. In one embodiment, the appearance of the subset of data objects is dependent at least in part, on the hierarchical relationships between the subset of data objects, and also on the viewing perspective of the user. When the user changes the viewing perspective, the system changes the appearance in a seemingly continuous, non-discrete manner.

According to another feature, the system profiles and re-profiles the data sources to update the data objects stored in the database. Re-profiling can be done, for example, periodically or on command. One advantage of the viewing system is that it deconstructs prior existing hierarchical relationships between the data objects before storing the data objects in the database. According to one feature, third parties can define how their associated data objects will be organized in the hierarchical relationships and can also define the physical paradigm(s) to be employed. According to another feature, the system enables a particular data source to reserve a portion of the virtual space for data objects from the particular data source.

In another feature of the invention, the user can modify the appearance of and/or the hierarchical relationship between data objects. In one embodiment, this is done using a graphical interface, to eliminate the need for the user to understand the underlying code implementation. In some embodiments the user can modify a position, height, width and depth of a plate, a parent-child relationship, a zoom-to relationship and/or a link-to relationship.

As mentioned above, in one embodiment, the system of the invention displays information to the user in a way that more closely tracks a selected physical paradigm. One way that the system does this is by employing a successive revelation of detail with regard to the displayed data objects. Successive revelation of detail approximates a physical appearance that the subset of data objects would have to the user having the viewing perspective of the user. In one embodiment, this entails providing the virtual appearance for each of the subset of data objects by rendering selected details of the subset of data objects. According to one feature, the system defines a virtual distance between the user and each of the data objects, and provides a visual appearance of each of the data objects that is at least in part dependent on the virtual distance. More particularly, the system displays more detail for data objects in response to a decreasing virtual distance, and less detail in response to an increasing virtual distance.

According to another feature, the system takes into account a virtual viewing direction of the user when rendering data objects for display. More particularly, the system defines a viewing direction for the user and an angle between the viewing direction and the data objects. The system then alters the visual appearance of the data objects based, at least in part, on this angle. Thus, the system can provide a three dimensional feel to a viewing user.

In a further embodiment, the system enables the user to control the viewing perspective. This feature provides the user with a feeling of virtually traveling through the data objects. By way of example, the data objects can be related to a grocery store and controlling the perspective can provide the user with a virtual experience comparable to walking through a grocery store. Further, in another embodiment, the user, unlike with physical barriers, can pan and zoom through the grocery store in any direction without regard for the "aisles" that may exist.

In a processing time saving feature, the system determines a projected virtual trajectory of the user by monitoring the user control of the viewing perspective. In this way, the system predicts the data objects that the user is most likely to next view. Using this prediction, the system caches graphical information for one or more data objects located along the projected virtual trajectory. The system then uses the cached graphical information to provide the virtual appearance for the one or more data objects, should the user continue along the projected virtual trajectory. According to one feature, the trajectory can be based on the virtual distance (e.g., x, y, z and time coordinates) between data items or based on the hierarchical relationship (e.g., parent—grandparent—brother) of the data objects.

According to another feature, the system enables the user to increase and decrease the virtual distance with respect to each of the subset of data objects, and provides the visual appearance of the subset of data objects, at least in part, in dependence on the changing virtual distance. In a related feature, the system defines a rate of change of the virtual distance, enables the user to control the rate of change, and provides the visual appearance of the subset of data objects at least in part in dependence on the rate of change. In this way, the system provides the user with a virtual experience comparable to accelerating or decelerating. In another related feature, the system defines a translational position of the user with respect to the subset of data objects, and enables the user to change the translational position with respect to the subset of the data objects. The system provides the visual appearance of the subset of data objects, at least in part, depending on the translational position. According to a further feature, the system defines a rate of change of the translational position of the user with respect to the subset of data objects, and enables the user to change this rate. In yet another feature, the user can also change viewing angle, along with the rate of change of the viewing angle.

According to another feature, the system of the invention provides for displaying information in the displays of a variety of platforms such as, televisions, personal computers, laptop computers, wearable computers, personal digital assistants, wireless telephones, kiosks, key chain displays, watch displays, touch screens, aircraft, watercraft, automotive displays, vending machines, machines that play music, and/or any other devices with a display screen. In one embodiment, when information is displayed, it is displayed with discrete options. In another embodiment, the options are ergonomically arranged to fit the hand of the user (e.g., having five selections in an arched presentation). The system also envisions employing a variety of user controls to provide the above discussed user controlled viewer experience. By way of example, the user may employ standard mouse and/or joystick controls. The user may also employ, for example, keystrokes, touch screen controls, electromechanical buttons, voice control, and/or a PDA pointer/touch screen/button combination. A new type of handheld wireless control is also envisioned as being applicable to the above-discussed system. Such a handheld wireless control is ergonomic in design and incorporates both electromechanical push buttons and a joystick. In one embodiment, the joystick can be manipulated in any direction, including up and down.

According to one implementation, the system organizes the data objects in a series of hierarchical plates for display. In one embodiment, each of the hierarchical plates includes hierarchically equivalent ones of the data objects. In another embodiment, each data object is organized on its own plate. According to one embodiment, the system defines a virtual distance from each of the hierarchical plates to the user, and displays to the user a least a subset of the hierarchically equivalent ones of the data objects included in a closest one of the hierarchical plates. The closest one of the hierarchical plates is defined as having the smallest virtual distance to the user. As the smallest virtual distance decreases, the system displays a reduced number of the hierarchically equivalent data objects included in the closest one of the hierarchical plates, but displays more detail with respect to the reduced number of data objects. As the smallest virtual distance increases, the system displays an increased number of the hierarchically equivalent data objects included in the closest one of the hierarchical plates, but displays less detail with respect to the increased number.

In another embodiment, each hierarchical plate has an associated virtual thickness and defines, at least in part, the virtual distance from the user to one or more of the data objects. As the user navigates through the hierarchical plate, the system displays more detail with respect to the one or more data objects. In other embodiments, some or all of the hierarchical plates are transparent, and thus the user can also view data objects on hierarchical plates that are located virtually behind the closest hierarchical plate.

According to a further embodiment, the system enables the user to pan the data objects on one or more hierarchical plates, such as the closest hierarchical plate, by defining a virtual translational position of the user with respect to the subset of objects on those hierarchical plates, and enabling the user to change the translational position with respect to the subset of data objects on those hierarchical plates. According to another feature, the system provides the visual appearance of the subset of the data objects, at least in part, in dependence on the translational position. In a related feature, the system enables the user to pan through vast numbers of data objects contained on one or more hierarchical plates by determining the subset of hierarchically equivalent data objects to be displayed, at least in part, in dependence on the translational position of the user.

According to yet a further embodiment, the system provides the user with a virtual viewing experience comparable to zooming through the information contained on the hierarchical plates. According to one feature, the thresholds between hierarchical plates are set such that the experience to the user is comparable to a continuous transition through a virtual experience that is comparable to an actual experience associated with the selected physical paradigm. In one aspect of the zooming feature, the system defines a threshold smallest virtual distance at which the closest hierarchical plate is determined to be located virtually behind the user. In response to the user navigating the viewing perspective to the threshold smallest virtual distance, the system ceases to display the closest one of the hierarchical plates, and defines a hierarchical plate having a next smallest virtual distance to be the closest one of the hierarchical plates.

According to another feature, the system provides an on-screen hierarchical positional indication to the user. In one embodiment, the system employs a series of concentric graphical screens to indicate position. By way of example, a hierarchical plate being viewed may be contained in a center-most screen, with hierarchical plates or objects that are located virtually behind the viewer being displayed in concentrically outer screens. In an alternative implementation, the system provides an on-screen "bread crumb," text or graphical indication of the user's virtual hierarchical position.

In a related embodiment, the system defines a three-dimensional coordinate system in virtual space and locates the data objects in the virtual space according to a template for a selected physical paradigm. In other embodiments, the system uses other multi-dimensional coordinate systems, such as spherical and/or cylindrical coordinate systems. The system displays a graphical representation of the subset of data objects and defines a viewing perspective of the user viewing the graphical representation. According to another feature, the system provides the graphical representation for the subset of data objects, at least in part, in dependence on the viewing perspective of the user.

In another aspect of the invention, the zoom technology can be distributed to users through various channels. In one embodiment, the zoom technology can be integrated into the operating systems of possible clients, such as those mentioned above. The manufacturer of a client licenses the invention for the rights to incorporate the zoom technology into its operating system. In another embodiment, the manufacturer of a client can license and provide the Zoom Browser™ as part of software resident on the client at the time of purchase. In another embodiment, the Zoom Browser™ can be sold as a separate software product to be purchased by the consumer and installed on the client by the consumer. In another embodiment, content providers can purchase/license a Zoom Enabling Kit™ to convert existing databases to Zoom Enabled™ databases. In another embodiment, application creators can purchase/license the zoom technology and incorporate it directly into applications sold to client manufacturers or consumers.

BRIEF DESCRIPTION OF THE DRAWINGS

The foregoing and other objects, features, and advantages of the invention, as well as the invention itself, will be more fully understood from the following illustrative description, when read together with the accompanying drawings, in which:

FIGS. 4A–4C are schematic views depicting data objects modeled as a node tree;

DESCRIPTION OF AN ILLUSTRATIVE EMBODIMENT

Figure 1:
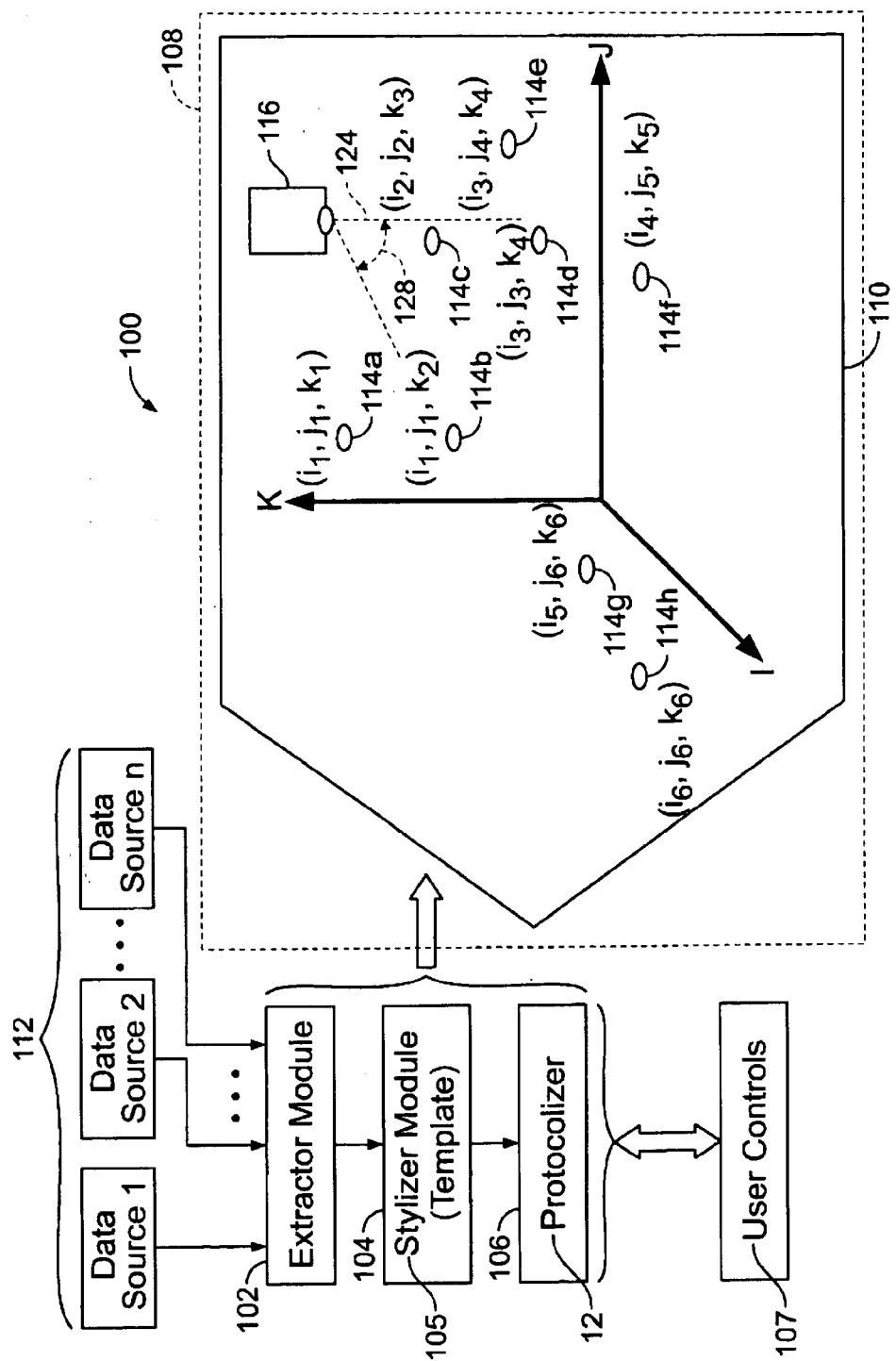
FIG. 1 is a conceptual diagram illustrating generation of a virtual display space in accord with an embodiment of the invention.
Figure 11:
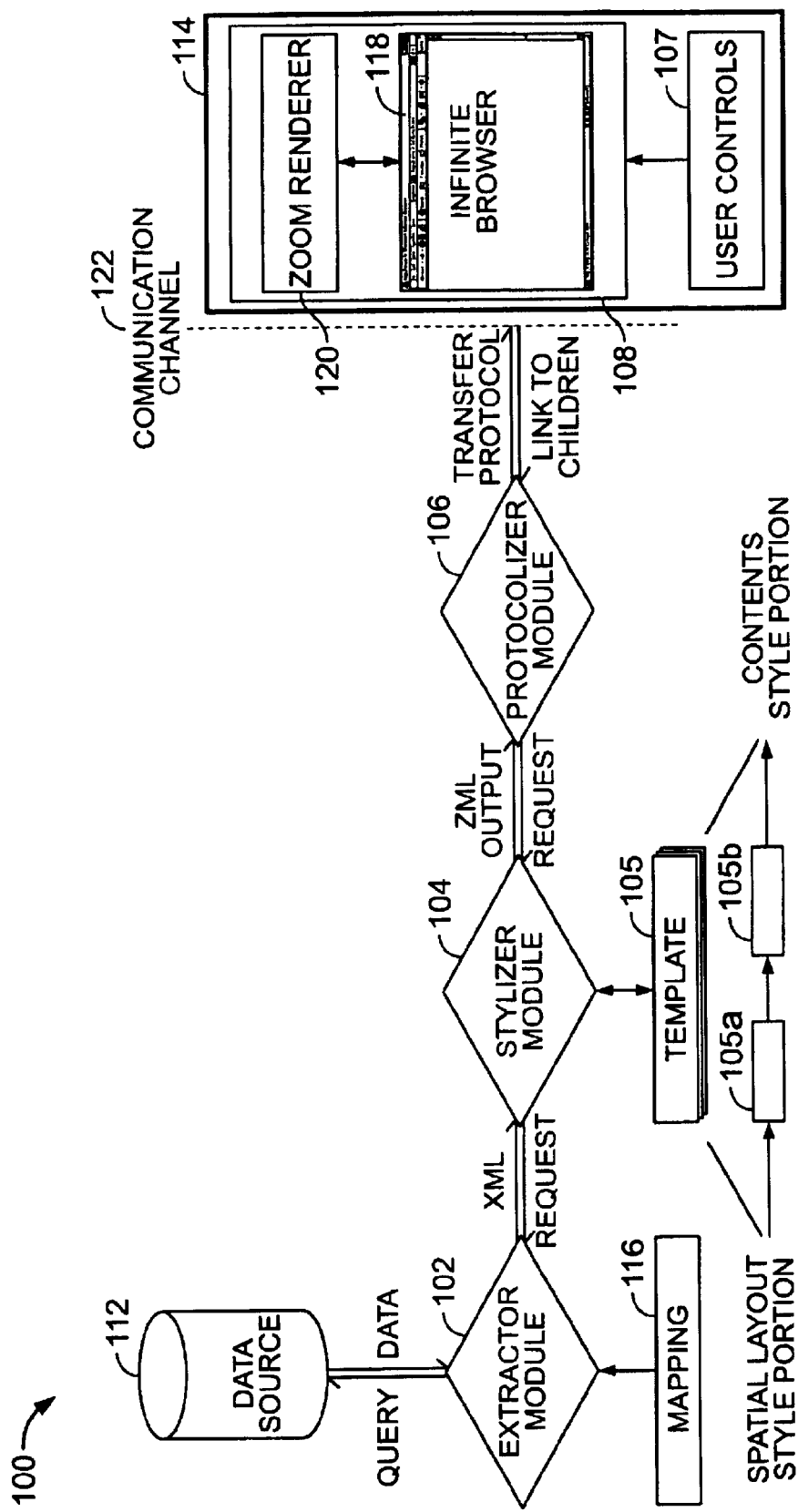
FIG. 11 is a schematic view depicting a system architecture in accordance with an embodiment of the invention.

FIG. 1 is a schematic diagram depicting an exemplary embodiment of a viewing a system 100 in accord with the invention. The viewing system 100 includes an extractor module 102, a stylizer module 104, a template 105, a protocolizer 106, user controls 107, and a display 108, which present data objects to the user in a virtual three dimensional space 110. The data source or sources 112 may be external to the system 100, or in some embodiments may be internal to the system 100. The extractor 102, stylizer 104 and protocolizer 106 operate in conjunction to organize data objects from the data source 112 and to locate for display those data objects in the virtual three-dimensional space 110. Exemplary displayed data objects are shown at 114a–114h. Described first below is an illustrative embodiment of the invention from the point of view of the user viewing the data objects 114a–114h from an adjustable viewing perspective. Following that description, and beginning with FIG. 11, is an illustrative description of the operation of the extractor module 102, the stylizer module 104, the protocolizer 106, the user controls 107, and the display 108.

In the virtual space 110, the adjustable user viewing perspective is represented by the position of a camera 116. The user manipulates the controls 107 to change the viewing perspective, and thus the position of the camera 116. Through such manipulations, the user can travel throughout the virtual space 110, and view, search through, and interact with, the data objects 114a–114g. According to the illustrative embodiment, the system 100 enables the user to change the viewing perspective of the camera 116 in an unrestricted fashion to provide the user with the feeling of traveling anywhere within the virtual space 110. In the embodiment of FIG. 1, the virtual space 110 is modeled as a Cartesian, three-dimensional coordinate system. However, other embodiments may include more dimensions. Additionally, the system 100 may employ other three dimensional coordinate systems, such as cylindrical and spherical coordinate systems. Further, as discussed below, such as with respect to FIG. 2, the data objects 114a–114h may be organized in the virtual space 110 in a variety of manners. In one embodiment, the camera 116 does not rotate, but moves freely along any of the three axes (i.e., i, j, k). By disabling rotation, it becomes easier for the user to remain oriented, and simpler to display the data objects 114a–114g. Disabling rotation also reduces the necessary computations and required display information details, which reduces data transfer bandwidths, processor and/or memory performance requirements. In other embodiments the camera 116 can move rotationally.

As the user adjusts the viewing perspective of the camera 116, the system 100 changes the appearance of the data objects 114a–114g accordingly. For example, as the user moves the camera 116 closer to a data object (e.g., 114a), the system 100 expands the appearance of the displayed image of the data object (e.g., 114a). Similarly, as the user moves the camera 116 farther away from a data object (e.g., 114a), the system 100 contracts the image of the data object 114a. Also, the system 100 displays the data object closest to the camera 116 as the largest data object and with the most detail. Alternatively, the system 100 displays data objects that are relatively farther away from the camera 116 as smaller and with less detail, with size and detail being a function of the virtual distance from the camera 116. The camera has a viewing direction 124. A data object may not be directly in the path of the viewing direction 124 (e.g., 114b), but at an angle 128 from the viewing direction. The system 100 also uses the viewing angle 128 to determine the size of the data object. In this way, the system 100 provides the user with an impression of depth of the fields. In the Cartesian, three-dimensional coordinate system model of the virtual space 110, the system 100 calculates the virtual distance from the camera to each data object using conventional mathematical approaches. In a further embodiment discussed in more detail below, the system 100 defines the smallest threshold virtual distance, less than which the system 100 defines as being behind the position of the camera 116. The system 100 removes from view those data objects determined to be virtually behind the camera 116. According to another feature, data objects can be hidden from view by other data objects determined to be virtually closer to the camera 116.

Figure 2:
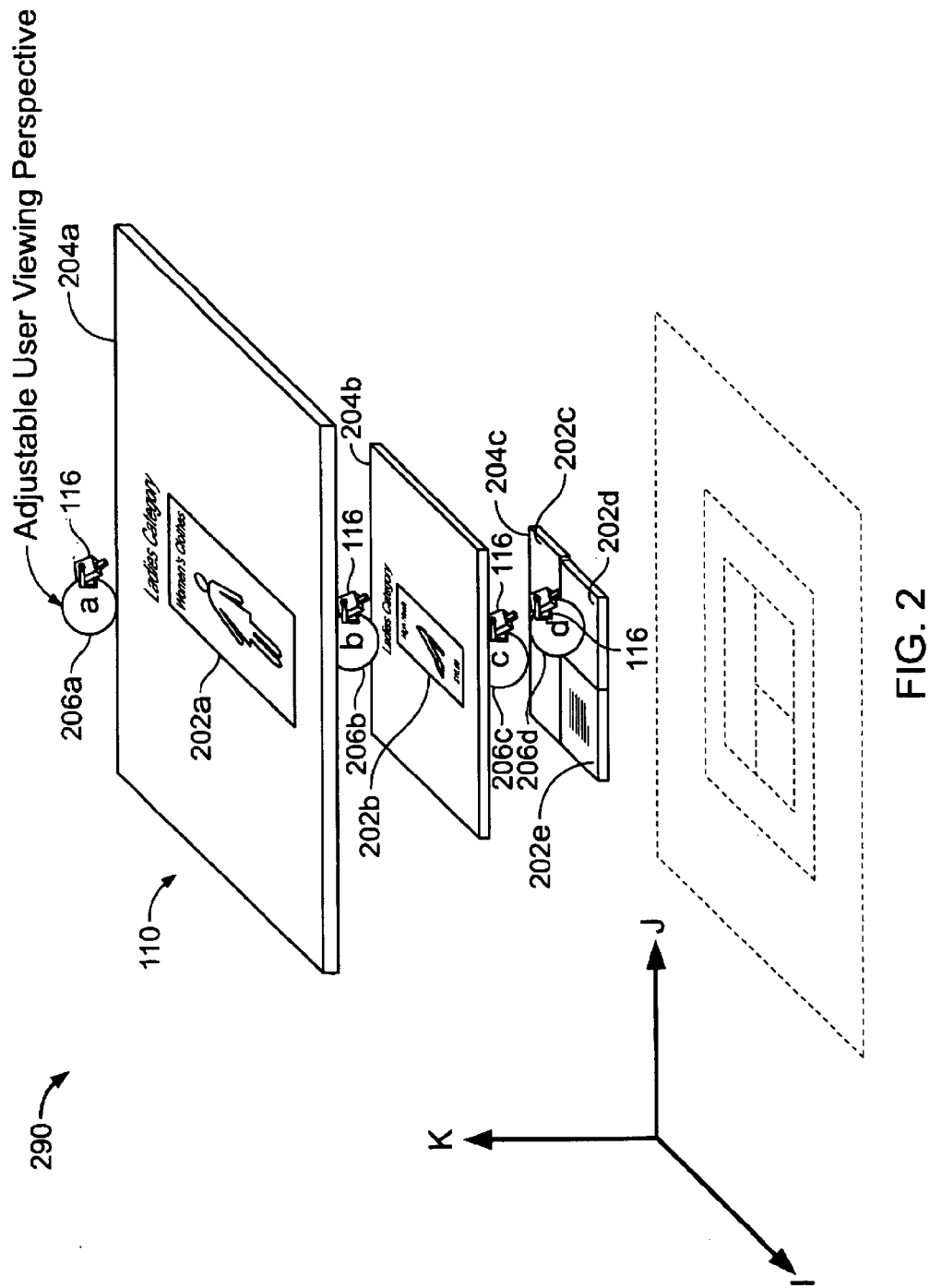
FIG. 2 is a schematic view depicting multiple viewing perspectives in accordance with an embodiment of the invention.

FIG. 2 provides a diagram that illustrates one way the system 100 can conceptually organize data objects, such as the data objects 114a–114h, depicted in FIG. 1. As depicted in FIG. 2, the system 100 conceptually organizes the data objects 202a–202e on virtual plates 204a–204c in the virtual space 110. As in FIG. 1, the virtual space 110 is modeled as a three axis (i.e., i, j, k) coordinate system. Again, the position 206 of a virtual camera 116 represents the user's viewing perspective. Although not required, to simplify the example, the camera 116 is fixed rotationally and free to move translationally. The data objects 202a–202e are organized on the virtual plates 204a–204c in a hierarchical fashion, based on a simplified template for a women's clothing store. As the user views information in the virtual space, as indicated by position "a" 206a of the camera 116, the system 100 illustratively presents an icon or graphical representation for "women's clothes" (data object 202a). However, as the user visually zooms into the displayed clothing store, as represented by positions "b–d" 206b–206d of the camera 116, the system 100 presents the user increasing detail with regard to specific items sold at the store. As the user virtually navigates closer to a particular plate, the system 100 displays less of the information contained on the particular plate to the user, but displays that portion within view of the user in greater detail. As the user virtually navigates farther away, the system 100 displays more of the information contained on the plate, but with less detail.

As described below, and as shown on the plate 204c, same plates may contain multiple data objects, thus enabling the user to pan across data objects on the same plate and zoom in and out to view data objects on other plates. In other embodiments, plates can be various sizes and shapes. Conceptually, each plate 204a–204c has a coordinate along the k-axis, and as the user's virtual position, represented by the position 206 of the camera 116, moves past the k-axis coordinate for a particular plate, the system 100 determines that the particular plate is located virtually behind the user, and removes the data objects on that plate from the user's view. Another way to model this is to represent the closest plate, for example the plate 204a, as a lid and as the user's viewing position 206 moves past the plate 204a, the system 100 "removes the lid" (i.e. plate 204a) to reveal the underlying plates 204b and 204c. For example, the closest plate may contain the continent of Europe. At first, when the user's viewing perspective is high along the k-axis, the user may view a map showing Europe displayed as a single entity. Then, as the user visually zooms through that plate and that plate is no longer in view, the system 100 may display to the user a plurality of European countries organized on a plurality of smaller plates. Alternatively, the system 100 may display a plurality of European countries organized on a single plate.

Figure 3:
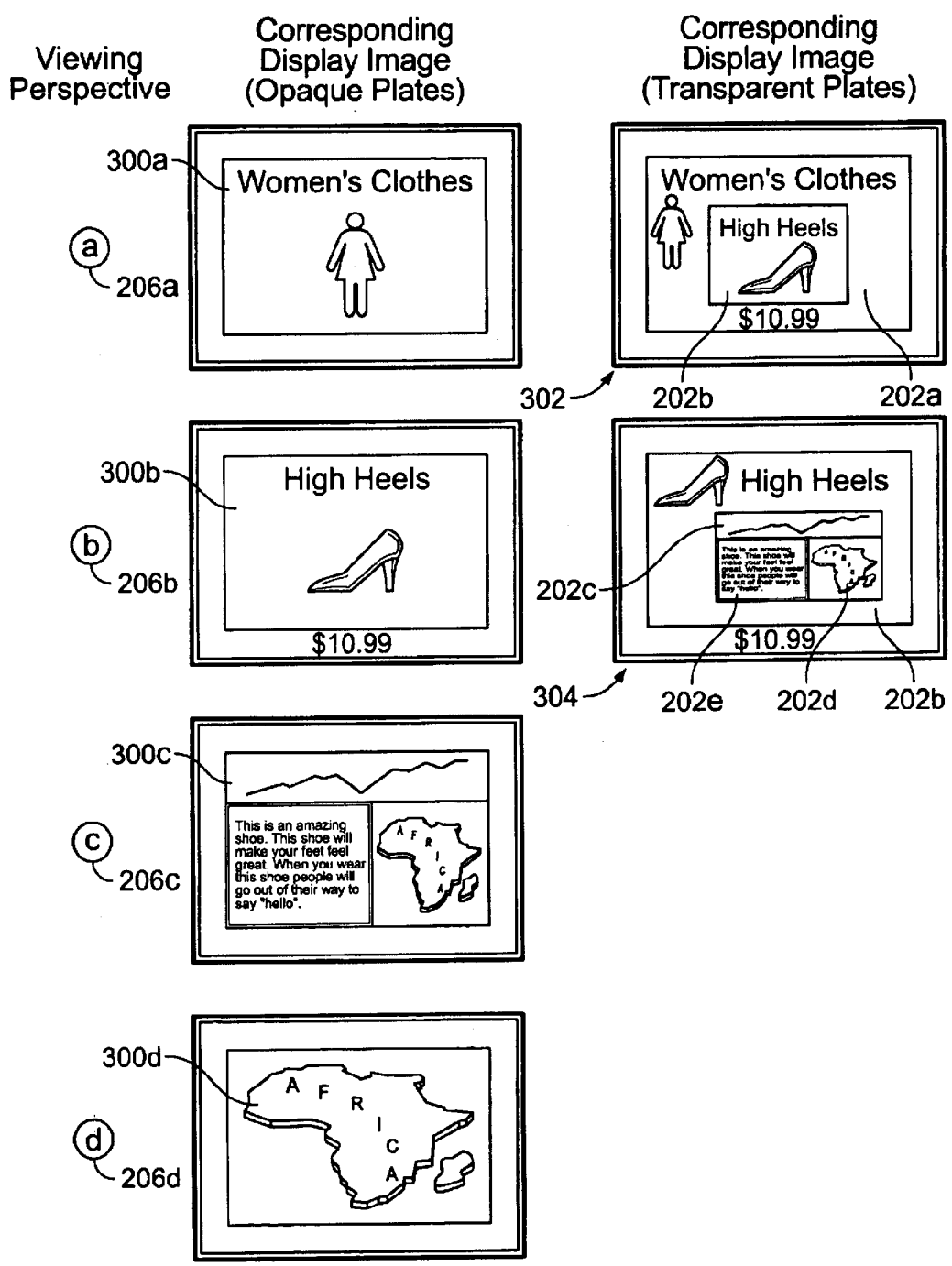
FIG. 3 depicts illustrative display images associated with corresponding user viewing perspectives shown in FIG. 2 and in accordance with an embodiment of the invention.

FIG. 3 provides a more detailed view of the data objects 202a–202c of FIG. 2. FIG. 3 also indicates at camera 116 positions a–d 206a–206d, the various appearances of displayed data objects at each of the viewing perspectives of the user. In some embodiments, the system 100 renders the plates 204a–204c as being opaque. Such an embodiment is illustrated by the appearances 300a–300d of the data objects 202a–202e in FIG. 3. As shown with opaque plates, the appearance 300 displayed to the user does not reveal data objects located initially behind other data objects. For example, with the user viewing perspective at position "a" 206a the system 100 only displays the appearance 300a of the data object 202a on the opaque plate 204a. Similarly, with the user having a virtual viewing perspective at position "b" 206b, the system 100 only displays the appearance 300b of the data object 202b located on the opaque plate 204b.

In other embodiments, the system 100 models the plates 204a–204c as being transparent. With transparent plates, the system 100 reveals to the user both the data objects on the closest plate, such as the plate 204a, and the data objects on the plate or plates virtually located hierarchically behind the closest plate, such as the data objects on the plate 204b. Such an embodiment is depicted at appearances 302 and 304 in FIG. 3. In the illustrative embodiment, the system 100 depicts the data objects on those plates that are virtually located further from the user as being smaller in the appearance, and with less detail. For example, referring to appearance 302, with the user viewing from the virtual position "a" 206a, the system 100 displays the data object 202a on the virtually closet plate 204a as being larger than the data object 202b on the virtually farther away plate 204b. Similarly, referring to appearance 304, with the user viewing from the virtual position "b" 206b, the system 100 displays the data object 202b on the virtually closest plate 204b as being larger and with more detail than the data objects 202c–202e on the plate 204c.

As mentioned briefly above, and as discussed further below, one advantage of the system 100 is that it can deconstruct prior existing hierarchical relationships between data objects, such as the data objects 202a–202e, and then reconstruct new hierarchical relationships based on a spatial paradigm. The spatial paradigm can include abstract, mathematical and physical paradigms. For example, the system can define a hierarchical relationship using a template related to a physical paradigm. As discussed above with respect to FIGS. 2 and 3, one illustrative physical paradigm is a retail store, such as a women's clothing store. Once the system 100 reorganizes the hierarchical relationships based on a template related to a physical paradigm, it can display the data objects to the user in such a way that relates to the hierarchical organization of the data objects in the physical paradigm, and thus enables the user to intuitively search through and interact with the data objects. By the way of example, in FIGS. 2 and 3, the user can easily shop for high heel shoes by viewing the virtual clothing store modeled in the virtual space 110, employing the user controls 107 to pan to women's clothing (data object 202a), to zoom and pan to women's shoes such as contained on the plate 204b, and then to pan and zoom to the high heels (data object 202b). As shown on the plate 204c, the user can zoom further to view the data objects 202c–202e to find additional information about a particular pair of shoes, such as sales history (data object 202c), where the shoes are made (data object 202d) and customer testaments (object 202e).

As an alternative to the Cartesian coordinate system of FIGS. 1 and 2, the virtual space 110, in which the system 100 hierarchically organizes the data objects to spatially relate to each other based on a physical paradigm, can also be conceptualized as a node tree. FIGS. 4A–4C illustrate such a conceptualization. More particularly, FIG. 4A depicts a node tree 400 that defines hierarchical relationships between the data nodes 402a–402h. FIG. 4B depicts a tree structure 404 that provides potential visual display representations 406a–406h for each of the data objects 402a–402h. FIG. 4C provides a tree structure 408 illustrative of how the user may navigate a displayed virtual representation 406a–406h of the data objects 402a–402h. The nodes of the node tree are representative of data objects and/or the appearance of those data objects.

FIG. 4C also illustrates one method by which the system 100 enables the user to navigate the data objects 402a–402h in an unrestricted manner. As indicated by the dashed connections 410a–410d, the system 100 enables the user to virtually pan across any data object on a common hierarchical level. By the way of example, the user may virtually navigate into a clothing store, graphically represented by the graphic appearance 406a and then navigate to women's clothing represented by the graphic appearance 406b. However, the system 100, based on a template related to a clothing store, has hierarchically organized men's clothing, represented by the graphic appearance 406c, to be at an equivalent hierarchical location to women's clothing 406b. Thus, the system 100 enables the user to pan visually from the women's clothing graphic appearance 406b to the men's clothing graphic appearance 406c, via the controls 107, to view men's clothing.

FIG. 4C also illustrates how the system 100 enables the user to virtually travel through hierarchical levels. By way of example, and as indicated by the links 412a–412b, the user can virtually navigate from any data object, such as the object 402a, assigned to a parent node in the tree structures 400, 404 and 408, to any data object, such as objects 402b and 402c assigned to a child node in those tree structures. The system 100 also enables the user to navigate visually for example, from a hierarchically superior data object, such as the object 402a, through data objects, such as the data object 402c along the paths 412b and 412d to a hierarchically inferior data object, such as the data object 402e. However, the motion displayed to the user is seemingly continuous, so that while virtually traveling through for example, the data object 402c, the system 100 displays the graphic appearance 406c as being larger with more detail and then as disappearing from view as it moves to a virtual position behind the user's viewing position.

FIG. 4C also illustrates how the system 100 enables the user to navigate between data objects, without regard for hierarchical connections between the data objects 402a–402h. More particularly, as indicated by the illustrative paths 414a and 414b, the user can navigate directly between the data object 402a and the data object 402g. As described in detail below with respect to Figures 10A and 10B, the system 100 also provides such unrestricted navigation using a variety of methods including by use of "wormholing," "warping," and search terms. In the node tree model of FIGS. 4A–4C, the system 100 displays a graphical representation of data objects to the user in a similar fashion to the coordinate-based system of FIGS. 1–3. More specifically, data objects located at nodes that are hierarchically closer to the user's virtual viewing position are displayed as being larger and with more detail than data objects located at nodes that are hierarchically farther away from the user's virtual viewing position. By way of example, in response to the user having a virtual viewing position indicated by the camera 416b, the system 100 displays the graphic appearance 406a to the user with greater detail and at a larger size than, for example, the graphic appearances 406b–406h. Similarly, the system 100 displays the graphic appearances 406b and 406c to the user with greater detail and at a larger size than it displays the graphic appearances 406d–406h. The system 100 employs a variety of methods for determining virtual distance for the purpose of providing a display to the user that is comparable to a physical paradigm, such as for example, the clothing store of FIGS. 4A–4C.

In the embodiment of FIG. 4A, the system 100 determines the user's virtual viewing position, indicated at 416a. Then, the system 100 determines which data object 402a–402h is closest to the user's virtual position and defines a plurality of equidistant concentric radii 418a–418c extending from the closest data object, 402c in the example of FIG. 4A. Since the data node 402c is closest to the user's virtual position, the system 100 displays the data object 402c with the most prominence (e.g., largest and most detailed). Alternatively, the data objects 402a, 402b, 402d and 402e, which are located equidistant from the data node 402c are displayed similarly with respect to each other, but smaller and with less detail than the closest data node 402c.

In another embodiment, the virtual distance calculation between nodes is also based on the hierarchical level of the data node that is closest to the user's virtual position. The nodes on the same hierarchical level are displayed as being the same size and with the same detail. Those nodes that are organized, hierarchically lower than the node closest to the user are displayed smaller and with less detail. Even though some nodes may be an equal radial distance with respect to the closest node, they may yet be assigned a greater virtual distance based on their hierarchical position in the tree 400.

In a physical paradigm, such as the retail clothing store of FIGS. 4A–4C, the user is less likely to be interested in data objects located at nodes on the same hierarchical level. By way of example, the user browsing men's clothing at the node 406c is more likely to navigate to men's pants at the node 406e than to navigate to women's clothing at the node 412a. Thus, in another embodiment, the system 100 includes the number of hierarchical links 412a–412g between nodes in the virtual distance calculation. For example, if the user's virtual location is at node 406e (e.g., pants), the radial distance for nodes 406d (e.g., shirts), 406g (e.g., type of shirt) and 406h (e.g., type of pants) may be equal. However, the calculated virtual distance to node 406h (e.g., type of pants) is less then than the calculated virtual distance to nodes 406d (e.g., shirts) and 406g (e.g., type of shirt), since the node 406h (e.g., type of pants) is only one link 412g from the node 406e (e.g., pants). Nodes separated by a single hierarchical link, such as the nodes 406e and 406h, are said to be directly related. The user is still able to freely travel to the less related nodes 406d and 406g in a straight line, so they are displayed. However the system 100 displays those nodes as being smaller and with less detail. When discussed in terms of the physical paradigm, the user is more likely to want to know about a type of pants 406h when at the pants node 406e than a type of shirt 406g.

In another embodiment, the system 100 gives equal weight to the direct relationship basis and the same hierarchical level basis in the virtual distance calculation. With this method, the system 100 considers the nodes 406d and 406h to be an equal virtual distance from the node 406e, and the node 406g to be farther away from the node 406e. Other embodiments may weight variables such as directness of relationship and hierarchical level differently when calculating virtual distance. Again, discussing in terms of the physical paradigm, the user may be equally interested in shirts 406d or a type of pants 406h when at the pants node 406e. The system 100 assumes that the user is less likely to want to know about a type of shirt 406g and thus, the system 100 sets the virtual distance greater for that node 406g than the other two nodes 406d, 406h, even though the radial distance is equal for all three nodes 406d, 406g, 406h.

Figure 5:
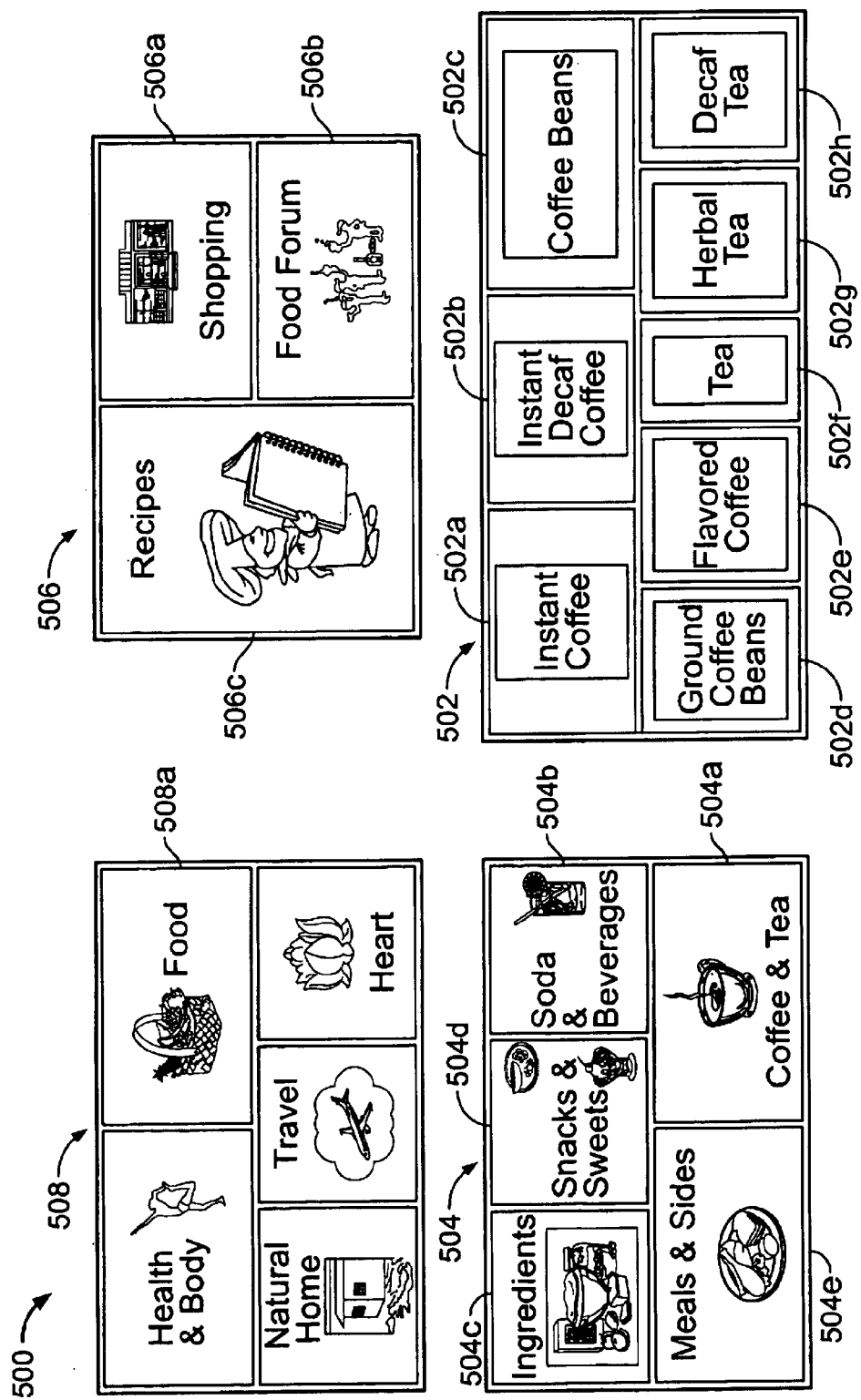
FIG. 5 depicts illustrative display images in accordance with an embodiment of the invention.

FIG. 5 depicts a plurality of display images 500 (i.e., graphic appearances) for the user having particular viewing perspectives, as rendered by a browser. As depicted, the user can navigate from a hierarchically macro level of broad categories (e.g., graphic appearance 508) to a hierarchically micro level of individual products (e.g., graphic appearance 502) using a template 105 related to a retail physical paradigm. To create the navigable environment, the system 100 organizes the data objects according to the template 105. As discussed in further detail below with regard to FIG. 11, the extractor module 102 collects data objects that relate to the physical paradigm. These data objects (e.g., leaf nodes), which may be products, services, transactions, actions and/or data, are spread out on a metaphorical field. Conceptually, according to the field metaphor, the system 100 initially does not stack the data objects vertically, but instead spreads them out on a base plane of the field. Then the system 100 drapes sheets of labels over the data objects, grouping them in to functional categories. For example, the system 100 groups the coffees and teas depicted at 502a–502h under the sheet "coffee and tea" and provides a graphic appearance 504a representative of coffee and tea. Similarly, the system 100 provides overlaying grouping sheets "sodas and beverages" 504b, "ingredients" 504c, "snacks and sweets" 504d, and "meals and sides" 504e. In effect, the overlaying grouping sheets label groups of items and summarize their purpose much in the same way as do the aisles in a store. These sheets can be modeled as 'lids' that the user can open to see the contents or detail within.

The system 100 then conceptually drapes larger grouping sheets over the first grouping sheets, thus grouping the data objects into greater categories. Such groupings are also evident in the hierarchical node structures of FIGS. 4A–4C. In the present illustrative example, the system 100 further groups the "coffee and tea" 504a, the "sodas and beverages" 504b and the "ingredients" 504c groups under the "shopping" category 506a. The system 100 continues this process until there is only a top-level grouping sheet that provides a home or start graphic appearance to the user. For example, the system 100 further groups the "shopping" grouping 506a, the "food forum" grouping 506b and the "recipes" grouping 506c under the "food" grouping sheet 508a of the home graphic appearance 508. In one embodiment, the grouping sheets are the conceptual plates, such as the plates 204a–204c discussed with respect to FIG. 2.

As discussed in further detail with respect to FIG. 10, the stylizer module 104 organizes data objects using the template 105. The template 105 relates to a physical paradigm. The user has experience with the physical world and how to interact with it. However, data in a database or scattered throughout the Web is typically not stored by hierarchical relationships that resemble any physical paradigm and thus lack intuitive feel. Physical paradigms cover a plurality of disciplines and industries. For example, physical paradigms can represent finance, education, government, sports, media, retail, travel, geographic, real estate, medicine, physiology, automotive, mechanical, database, e-commerce, news, infrastructure, engineering, scientific, fashion-based, art-based, music-based, anatomy, surveillance, agriculture, petroleum industry, inventory, search engines and internal personal digital assistant structure.

By relating a template to a physical paradigm, the system 100 enables the user to view and navigate through data from broad concepts, such as food (shown at 508a) to details, such as ground coffee beans (shown at 502d) and through everything in between. Table 1 below lists some examples of physical paradigms, along with illustrative broad (macro) concepts and related detailed (micro) elements.

TABLE 1

| Physical Paradigm | Macro | Micro |
| --- | --- | --- |
| Manufacturing | Supply and Demand | Unit Performance |
| Ecology | Global Biology | Local Chemistry |
| Information Systems | Network Capacity | Device Analysis |
| Economics | Many Markets | Many or One Product(s) |
| Organizational Charts | Company-Wide diagram | Personal/Unit Inspection |
| Computer Programs | Functional Diagrams/ Flows | Function Code |
| Electronics | Broad Functions | Detailed Circuitry |
| Retail Shopping | Broad Categories | Individual Products |

As mentioned above, one example conceptual layout of a template employs a field metaphor. According to a field template, the system 100 organizes the leaf nodes representing data objects on the field, without covering them with labels. Such an embodiment enables the user to pan over the laid-out data objects and to zoom visually into data objects of interest. Such a template can be considered analogous to spreading out all of the pages of a document on a table, instead of stacking the pages into a pile. Such a template enables the user to easily preview and print large data sets, such as Web sites.

Another example template 105 relates to a card catalog paradigm. In this embodiment, the extractor module 102 extracts information describing elements of a data source, such as author, date, brief description, number of pages, title, size, key words, images and/or logos. The system 100 then organizes the extracted information much like a library card catalog system, thus enabling the user to browse visually many data sources, such as Web sites, for their essential information.

Figure 19:
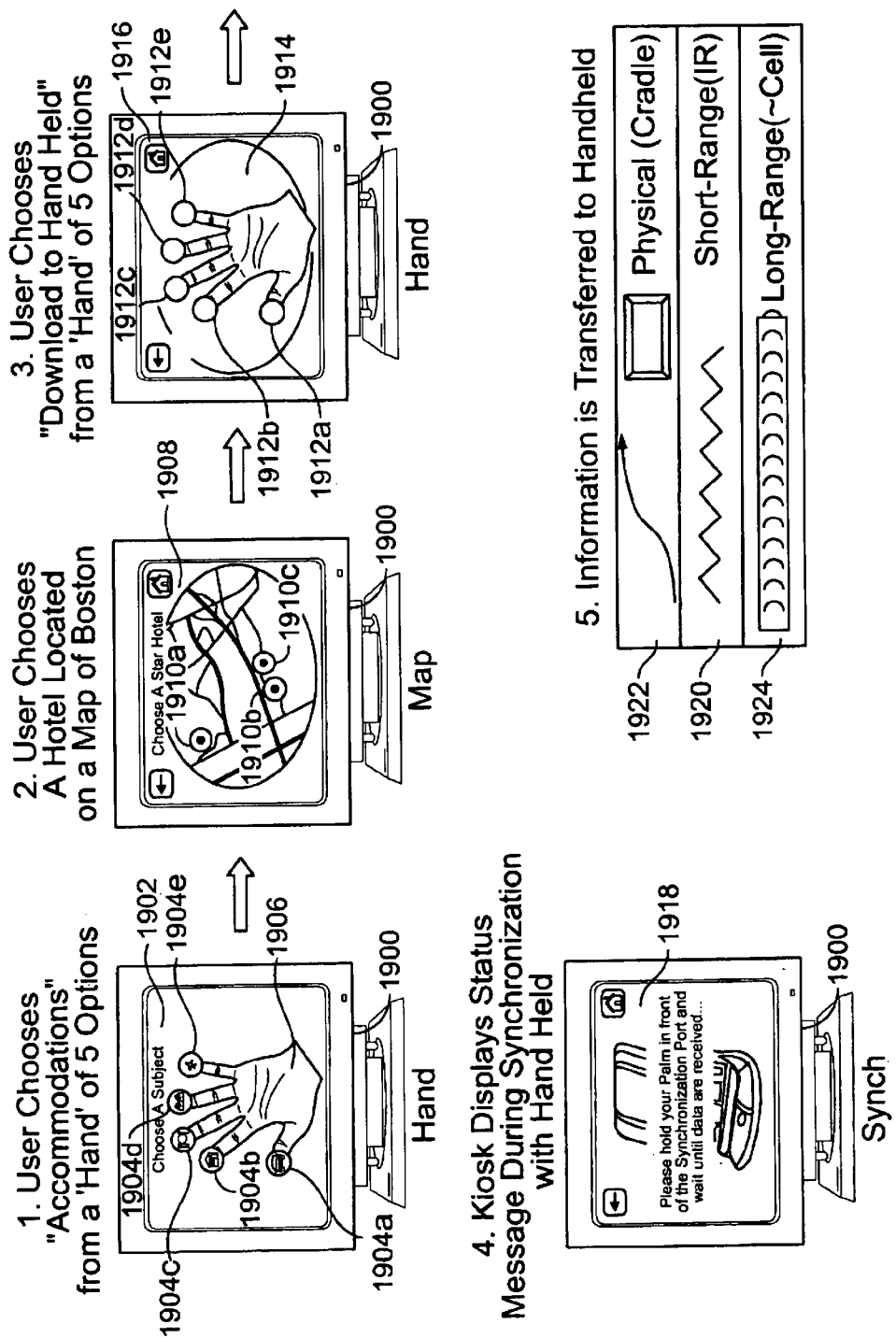
FIG. 19 depicts illustrative display images of the user viewing perspective as rendered on a kiosk.

Another example template relates to organizing a graphical representation of data objects for use in a kiosk. In one embodiment, a kiosk is a remote computer in a public place with which the user can communicate by using, for example, a wireless link, between the user's handheld computer and the kiosk. In another embodiment, the kiosk is a computing device wherein the user communicates directly with the kiosk, for example, by way of a keypad or a touch screen to navigate through and interact with the displayed data objects. According to one embodiment, the system 100 arranges graphical representations of the data objects ergonomically in an arched pattern to fit a person's hand. In one preferred embodiment, the system 100 displays five or less options per hierarchical abstraction level so that the user can swiftly touch choices using one hand on the touch screen to navigate through the available data objects. Illustrative kiosk displays are depicted in FIG. 19 and discussed in further detail with respect to that Figure. In one embodiment, in response to the user navigating to the leaf nodes, the system 100 may display more than five graphical representations of data objects to the user. By way of example, in response to the user navigating to the men's pants node 406e of FIG. 4, the system 100 may display to the user more than five selections of men's pants.

Another example template 105 relates to a geographical physical paradigm. The geographic appearance template 105 is similar to the retail template illustrated in FIG. 5. The system 100 extracts data objects to be the leaf nodes and conceptually spreads them out on a base plane or field. Next, the system 100 hierarchically groups, labels and generates graphic appearances for the leaf nodes until ultimately the system 100 provides a home display. However, with a geographical template, data nodes have spatial relevance.

Hotels, restaurants, and stadiums all have a place in the world and therefore have a specific i, j, k coordinate location in the virtual space 110 associated with their actual position in the physical world. Hierarchical abstraction levels or groupings include, for example, World, Continent, Country, City, Street, Buildings, and IntraBuilding.

Another example template is a Body Zoom™ template. This is a template to store, display, retrieve all the physiological, anatomic, medical, aesthetic and information about each and all body parts as related to medical, biotechnological, chemical, biologic, psychologic conditions. For example, the system 100 displays a human body, and the user chooses to zoom into a specific body part. The system 100 changes the viewing perspective to display information of/about and related to the body part chosen by the user. In one embodiment, the body template is a zoomable map of a clothing store where data objects corresponding to clothing products are located in virtual space in accordance with the body part they are intended for. Shoes are in the foot region, hats are in the head region, shirts in the torso region, and gloves in the hand region. A similar methodology can be used for supermarkets, using supermarket aisles as the template. Another example is a desktop financial template. Using this template, the system 100 displays a picture of a desk with a calendar, phone, stock ticker, a newspaper and the like. Each item displayed generates a function when the user navigates to that item. For example, when the user navigates to the phone, the system 100 performs calling functions (e.g., dialing a user entered number), and when the user navigates to the newspaper, the system 100 zooms the viewing perspective through the news, allowing the user to navigate in an unrestricted fashion.

Figure 6:
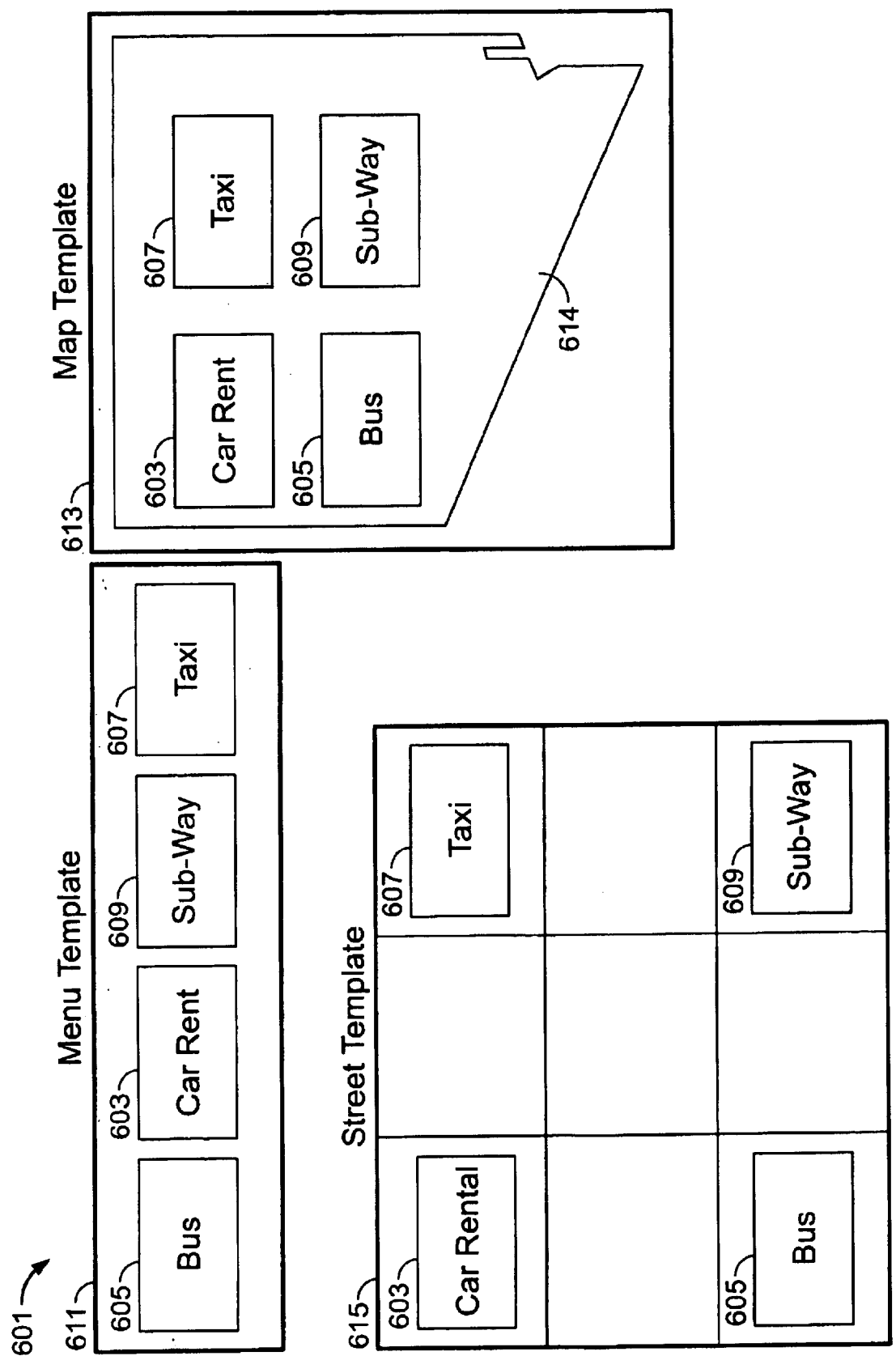
FIG. 6 is a conceptual diagram illustrating use of a plurality of templates in accordance with the invention.

FIG. 6 depicts a block diagram 601 illustrating the use of multiple templates in combination. In this illustration, four templates 603, 605, 607 and 609 represent four different transportation services; car rentals 603, buses 605, taxies 607, and subways 609. Illustratively, the bus 605 and subway 609 templates contain map and schedule information, and fares are based on the number of stops between which a rider travels. The taxi template 607 has fare information based on mileage and can contain map information for calculating mileage and/or fares. The car rental template 603 contains model/size information for various vehicles available for rent, and fares are based on time/duration of rental. The hierarchical layout for each template 603, 605, 607, and 609 is organized in accord with the invention to provide an intuitive virtual experience to the user navigating the information. As depicted in FIG. 6, the templates 603, 605, 607, and 609 can themselves be hierarchically organized (i.e. a top-level hierarchical relationship) through the use of the super templates 611, 613 and 615. More specifically, in one example, the system 100 organizes the templates 603, 605, 607, and 609 using a menu super template 611. The menu super template 611 relates the templates 603, 605, 607, and 609 on a common hierarchical level, showing that all four transportation services 603, 605, 607, and 609 are available. Illustratively, the super template 611 organizes the templates 603, 605, 607, and 609 alphabetically.

In another example, the system 100 organizes the templates 603, 605, 607, and 609 using a map super template 613. The map super template 613 relates to a geographical location physical paradigm. The map super template 613 relates the four templates 603, 605, 607, and 609 in accordance with the geographical relationship between the represented transportation services (i.e. car rental, bus, taxi and subway). The map super template 613 can be used, for example, when the user wants to know which transportation services are available at a particular geographical location. For example, the user may be trying to decide into which airport to fly in a certain state 614, and wants to locate information about transportation services available at the different airports within the state.

In a further example, the system 100 organizes the templates 603, 605, 607 and 609 using a street super template 615. The street super template 615 relates to a street layout physical paradigm. The street super template 615 spatially relates the templates 603, 605, 607 and 609 to each other in terms of their street location. The super template 615 can be used, for example, when the user has a street address and wants to know which transportation services are available nearby. In a further embodiment, the user can begin with the map super template 613 to find a general location and then pan and zoom to the street level using the street super template 615.

As skilled artisans will appreciate, the system 100 may also employ any number of templates 105 in combination. By way of example, with regard to the kiosk of FIG. 19, in one embodiment, the system 100 may first employ the ergonomic display discussed above, but then at some point switch to employing a display corresponding to a geographical template. Illustratively, such may be the case when a kiosk user is navigating to hotel accommodations. The system 100 may employ a geographic appearance template to display hotel locations to the user.

Additionally, the system 100 may employ irregular display shapes for advanced visual recognition. For example, the graphic appearance associated with each data node can be defined to have a unique shape such as star, pentagon, square, triangle, or the like. With a conventional desktop metaphor, display area availability is at a premium, thus rendering it impractical to employ irregular shapes. However, the panning and zooming features of the system 100 render display space essentially infinite. Thus, the display of virtually any client can be configured in favor of readability and an overall user experience. An aspect of the illustrative viewing system 100 provides the user with the sense of real-time control of the displayed data objects. Rather than a stop and go display/interactive experience, the system 100 provides an information flow, a revealing and folding away of information, as the user requires information. Accordingly, the state of the system 100 is a function of time. The user adjusts the virtual viewing position over time to go from one data object to the next. Therefore, a command for the virtual viewing position of the user, represented in FIGS. 1 and 2 by the position of the camera 116, is of the form $f(x, y, z)$, where $(x, y, z)=f(t)$. The appearance of data objects that the system 100 displays to the user is a function of time as well as position.

According to the illustrative embodiment, as the user changes viewing perspective, the system 100 changes the appearance of a graphical representation of the data objects in a smooth, continuous, physics-based motion. According to one embodiment, all motion between viewing perspective positions, whether panning (e.g., translational motion along the i, j and k axes of FIGS. 1 and 2) or zooming (e.g., increasing detail of closest data objects), is performed smoothly. Preferably, the system 100 avoids generating discrete movements between locations. This helps ensure that the user experiences smooth, organic transitions of data object graphical appearances and maintains context of the relationship between proximal data objects in the virtual space, and between the displayed data objects and a particular physical paradigm being mimicked by the system 100.

In one embodiment, the system 100 applies a sine transformation to determine the appropriate display. For example, the virtual motion of the user can be described as linear change from t=0 to t=1. The system 100 applies a sine transform function to the discrete change, for example t_smooth=sin(t*pi/2) where t changes from 0 to 1. The discrete change is changed to a smoother, rounded transition.

One way to model the motion for adjustments of the user viewing perspective is to analogize the user to a driver of a car. The car and driver have mass, so that any changes in motion are continuous, as the laws of physics dictate. The car can be accelerated with a gas pedal or decelerated with brakes. Shock absorbers keep the ride smooth. In terms of this model, the user controls 107 of system 100 are analogously equipped with these parts of the car, such as a virtual mass, virtual shocks, virtual pedals and a virtual steering wheel. The user's actions can be analogized to the driving of the car. When the user is actuating a control, such as key, joystick, touch-screen button, voice command or mouse button, this is analogous to actuating the car's accelerator. When the user deactuates the control and/or actuates an alternative control, this is analogous to releasing the accelerator and/or actuating the car's brakes. Thus, the illustrative system 100 models adjusting of the user viewing perspective as movement of the camera 116. The system assigns a mass, a position, a velocity and an acceleration to the camera 116.

In another embodiment, the system 100 models the user's virtual position logarithmically, that is, for every virtual step the user takes closer to a data object (e.g., zooms in), the system 100 displays to the user a power more detail of that data object. Similarly, for every virtual step the user takes farther away from a data object (e.g., zooms out), the system 100 displays to the user a power less detail for that data object. For example, the following illustrative code shows how exemplary exp() and log() functions are used:

```
// returns the conversion factor of world width to screen width
static double world_screen_cfactor(double camera_z)
{
    return exp(camera_z);
}
static double world_width_and_screen_width_to_camera_z(double world_dx, int screen_dx)
{
    if(world_dx==0) return 1;
    return log(((double)screen_dx)/world_dx);
}
```

Figure 7:
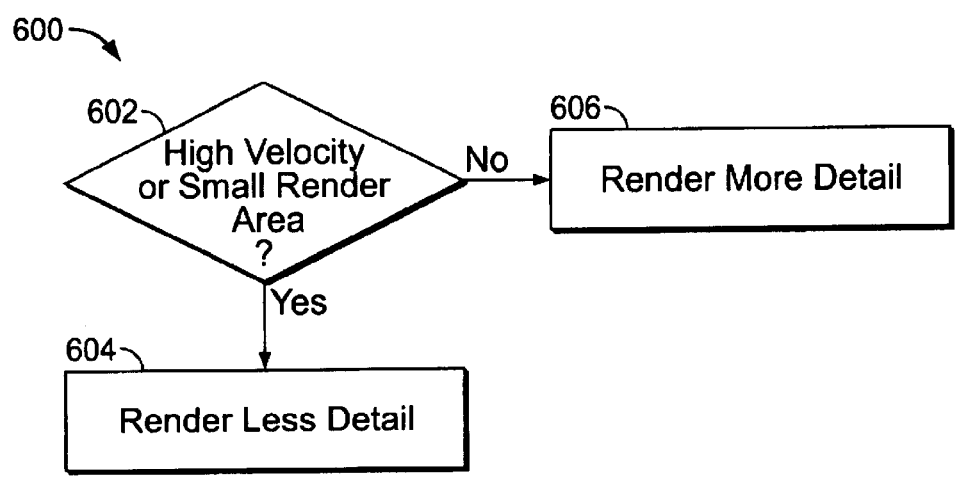
FIG. 7 is a flowchart depicting a method of rendering detail in accordance with an embodiment of the invention.

FIG. 7 provides a simplified flow diagram 600 depicting operation of the system 100 when determining how much detail of a particular data object to render for the user. This decision process can be performed by a client, such as the client 114 depicted in FIG. 11 or by the stylizer module 104. As the decision block 602 illustrates, the system 100 determines the virtual velocity of the change in the user's virtual position, and employs the virtual velocity as a factor in determining how much detail to render for the data objects. The system 100 also considers the display area available on the client to render the appearance of the data objects (e.g., screen size of client 114). As indicated in steps 602 and 604, in response to determining that the virtual velocity is above one or more threshold levels, the system 100 renders successively less detail. Similarly, as also indicated by steps 602 and 604, the system 100 also renders less detail as the available display area at the client 114 decreases. Alternatively, as indicated by steps 602 and 606, as the virtual velocity decreases and/or as the available display area at the client 114 increases, the system 100 renders more detail. Thus, the system 100 makes efficient use of display area and avoids wasting time rendering unnecessary details for fast-moving data objects that appear to pass by the user quickly.

Figure 8:
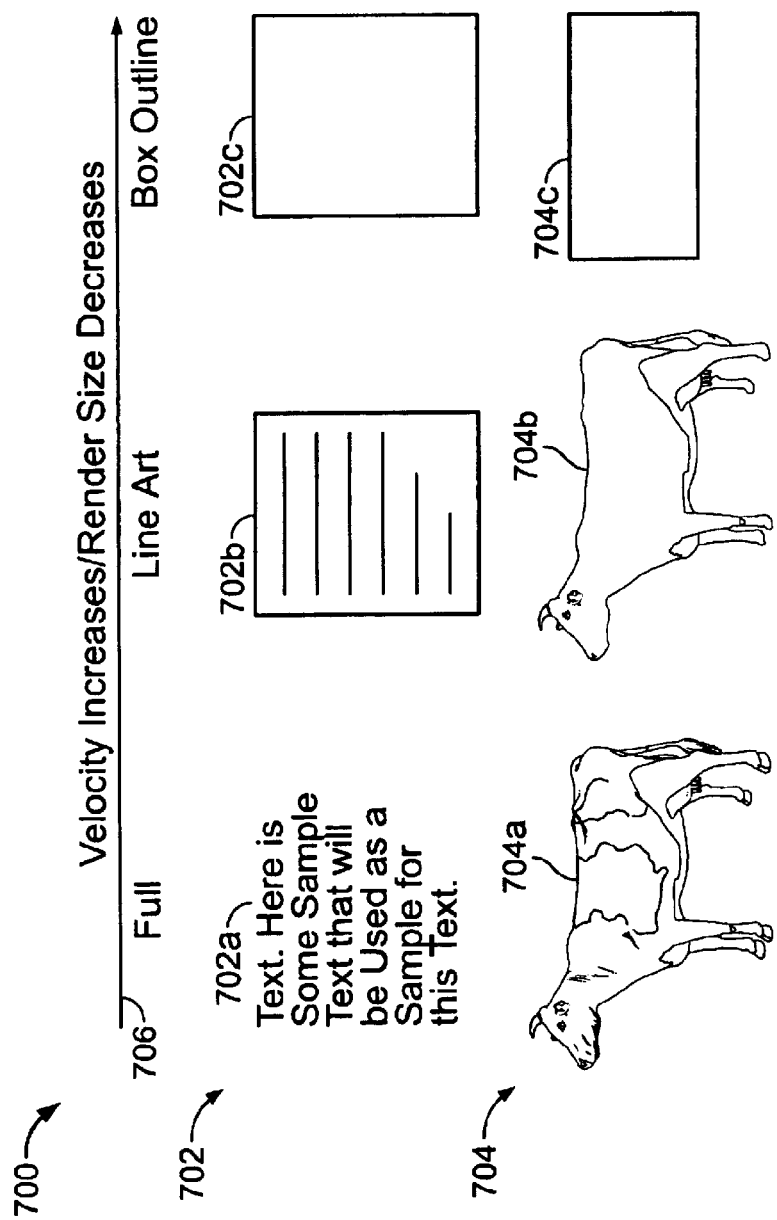
FIG. 8 is an illustrative example of rendering detail in accordance with an embodiment of the invention.

FIG. 8 illustrates various potential appearances 702*a*–702*c* for a textual data object 702, along with various potential appearances 704*a*–704*c* for an image data object 704. The axis 706 indicates that as virtual velocity increases and/or as client display area decreases, the system 100 decreases the amount of detail in the appearance. At the "full" end of the axis 706, the virtual velocity is the slowest and/or the client display area is the largest, and thus, the system 100 renders the textual data object 702 and the image data object 704 with relatively more detail, shown at 702*a* and 704*a*. At the "box outline" end of the axis 706, the velocity is the greatest and/or the client display area is the smallest, and thus the system 100 renders the appearance of the same data objects 702 and 704 with no detail 702*c* and 704*c* respectively. Instead, the system 100 renders the data objects 702 and 704 simply as boxes to represent to the user that a data object does exist at that point in the virtual space 100, even though because of velocity or display area, the user cannot see the details. In the middle of the axis 706 is the "line art" portion. In response to the virtual velocity and/or the available client display area being within particular parameters, the system 100 renders the data objects 702 and 704 as line drawings, such as that depicted at 702*b* and 704*b* respectively.

In the illustrative embodiment, the system 100 transmits and stores images in two formats. The two formats are raster graphic appearances and vector graphic appearances. The trade-off between the two is that raster graphic appearances provide more detail while vector graphic appearances require less information. In one embodiment, raster graphic appearances are used to define the appearance of data objects. Raster graphic appearances define graphic appearances by the bit. Since every bit is definable, raster graphic appearances enable the system 100 to display increased detail for each data object. However, since every bit is definable, a large amount of information is needed to define data objects that are rendered in a large client display area.

In another embodiment, the raster graphic appearances, which require large size data words even when compressed, are omitted and instead the system 100 employs vector graphic appearances and text, which require a smaller size data word than raster graphic appearances, to define the appearance of data objects. Vector graphic appearances define the appearance of data objects as coordinates of lines and shapes, using x, y coordinates. A rectangle can be defined with four x, y coordinates, instead of the x times y bits necessary to define the rectangle in a raster format. For example, the raster graphic appearance of the country of England, which is in gif form, highly compressed, is over three thousand bytes. However, the equivalent vector version is roughly seventy x, y points, where each x, y double is eight bytes for a total of five hundred sixty bytes. A delivery of text and vector images creates a real-time experience for users, even on a 14.4 kilobyte per second modem connection.

Figure 9:
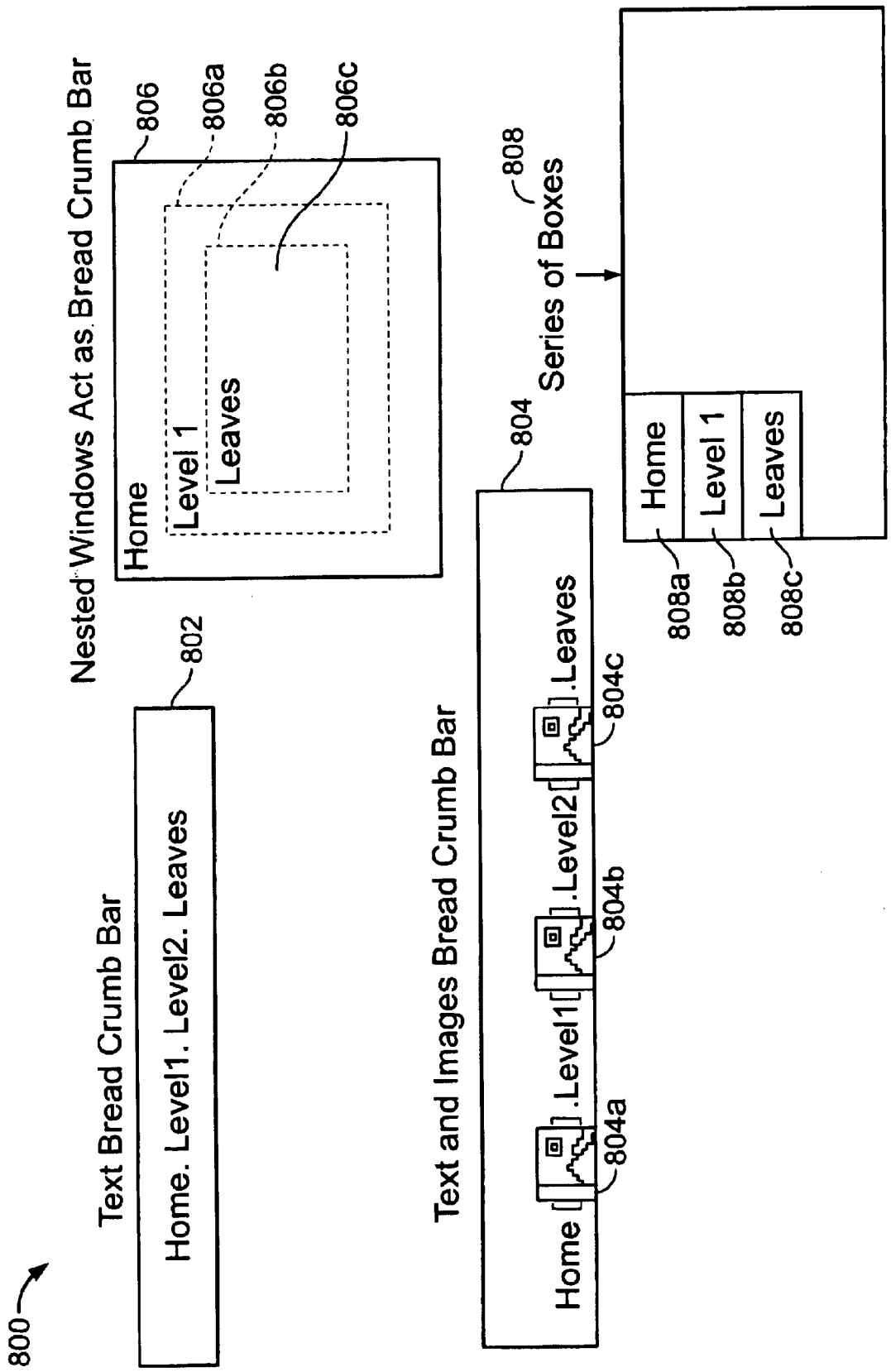
FIG. 9 depicts illustrative embodiments of breadcrumb trails in accordance with the invention.

FIG. 9 illustrates various embodiments of visual indicators employed by the system 100. In addition to displaying data objects to the user, the system 100 also displays visual indicators to provide the user an indication of the hierarchical path the user has virtually navigated through in the virtual space 110. This is sometimes referred to as a breadcrumb trail. In one embodiment, the system 100 provides a text breadcrumb bar 802. The illustrative text breadcrumb bar 802 is a line of text that concatenates each hierarchical level visited by the user. For example, referring back to FIG. 5, the graphic appearance 508a is the "home" level, the graphic appearance 506b is level 1, the graphic appearance 504a is level 2 and the graphic appearance 502 is the "leaves" level. The associated text breadcrumb trail is thus, "food.shopping.coffee&tea." This represents the selections (e.g., plates, data nodes) that the user virtually traveled through (e.g., by way of zooming and panning) to arrive at the display of products in the graphic appearance 502.

According to another embodiment, the system 100 provides a text and image bread crumb bar 804. Like the text breadcrumb trail 802, the text and image breadcrumb trail 804 is a concatenation of each hierarchical level through which the user virtually travels. However, in addition to text, the trail 804 also includes thumbnail images 804a–804c to give the user a further visual indication of the contents of each hierarchical level. In another embodiment, the system 100 provides a trail of nested screens 806. Each nested screen 806a–806c corresponds to a hierarchical level navigated through by the user. In another embodiment, the system 100 provides a series of boxes 808 in a portion of the display. Each box 808a–808c represents a hierarchical level that the user has navigated through and can include, for example, mini screen shots (e.g., vector condensation), text and/or icons. In another embodiment, the user can perform an action to select a particular hierarchical level, for example click on the visual indicator of a particular hierarchical level, and the system 100 changes the viewing perspective to the virtual location of that particular hierarchical level. The system 100 effects this change by warping, as described in more detail below with FIGS. 10A and 10B, from the current virtual location to the selected virtual location.

According to another feature, the system 100 enables the user to preview data objects without having to zoom to them. According to one embodiment, in response to the user moving a cursor over a region of the display, the system 100 reveals more detail about the data object(s) over which the cursor resides. By way of example, referring to the plates 204a–204c of FIG. 2, in response to the user placing the cursor in a particular location, the system 100 displays data objects on one or more plates behind the plate in current view. The term "fisheye" refers to a region, illustratively circular, in the display that acts conceptually as a magnified zoom lens. According to a fisheye feature, the system 100 expands and shows more detail of the appearance of the data objects within the fisheye region. In one embodiment, these concepts are used in combination with a breaderumb trail. For example, in response to the user locating the cursor or moving the "fisheye" on a particular hierarchical level of a breadcrumb trail the system 100 displays the contents of that particular hierarchical level. According to one embodiment, the system 100 displays such contents via a text information bar. Thus, these functions enable the user to preview a data object on a different hierarchical level, without actually having to change the viewing perspective to that level, and to make enhanced usage of the breadcrumb trails illustrated in FIG. 9.

Figure 10A:
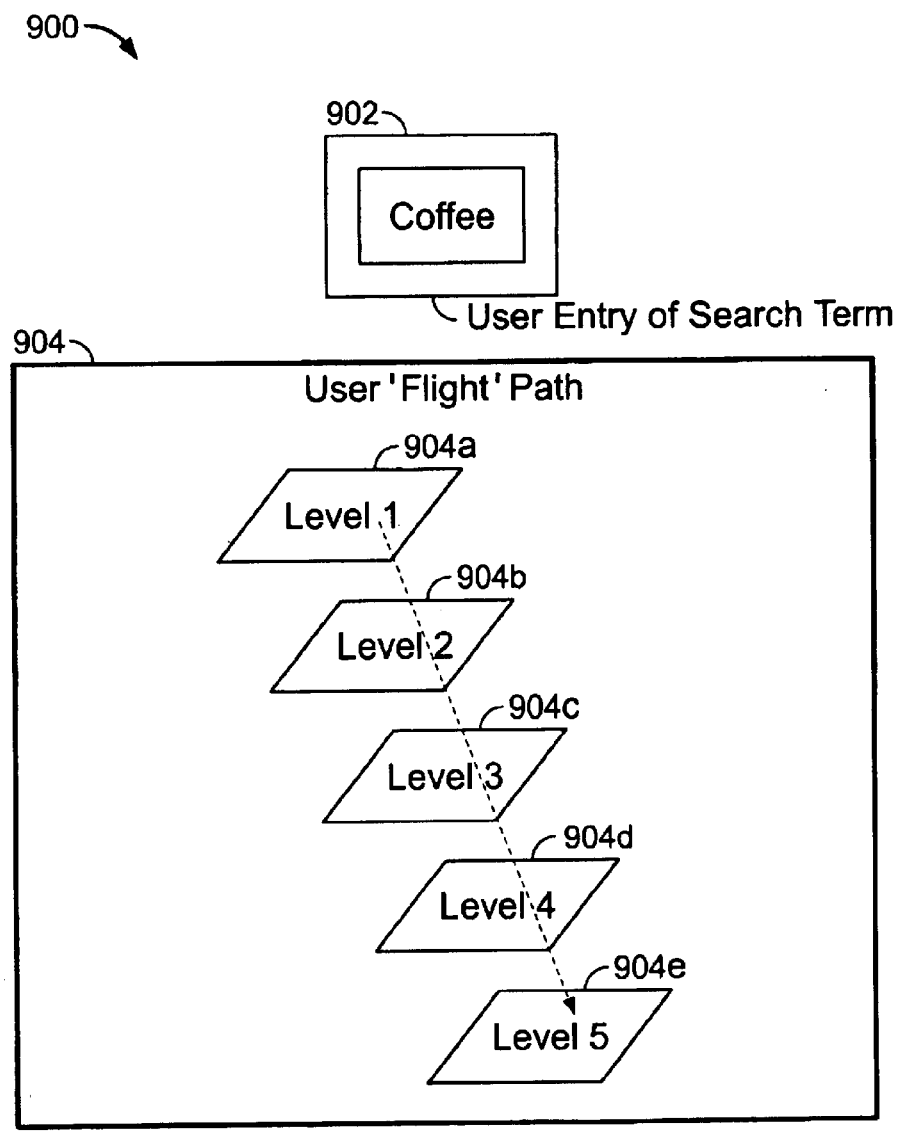
FIG. 10A illustrates use of search terms in accordance with an embodiment of the invention.

FIG. 10A provides a conceptual diagram 900 illustrating two methods by which the user can virtually navigate to any available data object, or hierarchical level. The two illustrative methods are "warping" and search terms. An exemplary use of search terms and warping is as follows. Referring also back to FIG. 5, from the home graphic appearance 508, the user can input a search term, such as "coffee" 902. In response, the system 100 automatically changes the user's virtual location (and thus, hierarchical level), and displays the graphic appearance 502, whereby the user can zoom into any of the graphic appearances of available products 502a–502h. As illustrated by the user 'flight' path 904, the virtual motion of the viewing perspective is a seemingly continuous motion from a starting hierarchical level 904a at the data object graphic appearance 508 to the hierarchical level 904e of the data object graphic appearance 502 corresponding to the entered search term 902. As the user virtually travels through the intermediate hierarchical levels 904b–904d associated with the data objects 508a, 506b and 504a, respectively the system 100 also renders the data objects that are virtually and/or hierarchically proximate to the intermediate data objects 508a, 506b and 504a. This provides the user with an experience comparable of traveling through the virtual, multi-dimensional space 110 in which the data objects are located. However, very little detail is used, as the velocity of the automatic change of location of the viewing perspective is very fast.

The system 100 also provides a new type of searching through an advertisement, even if the advertisement is located on a "traditional" Web page. According to one embodiment, in response to the user selecting a displayed advertisement, the system 100 virtually transports the user to a virtual space, such as the three-dimensional space 110, that contains data objects selected for the advertisement and hierarchically organized according to a template 105. Because of the nearly infinite virtual space, business entities can create advertisement spaces that contain aspect geared for all demographic appearances, and let the user browse through the data objects and gravitate to those of interest.

For example, an advertisement might simply state "Enter the world of 'FamousMark' merchandise." Illustratively, in response to the user selecting the advertisement, the system 100 displays a graphical representation of a multi-dimensional virtual space, having for example, conceptual plates, such as the plates 204a–204c, including graphical representations of data objects relating to various kinds of 'FamousMark' merchandise, organized in spatial, hierarchical structure according to a template. Preferably, the merchandise is organized in an intuitive, hierarchical manner as illustrated in the previously discussed embodiments.

Figure 10B:
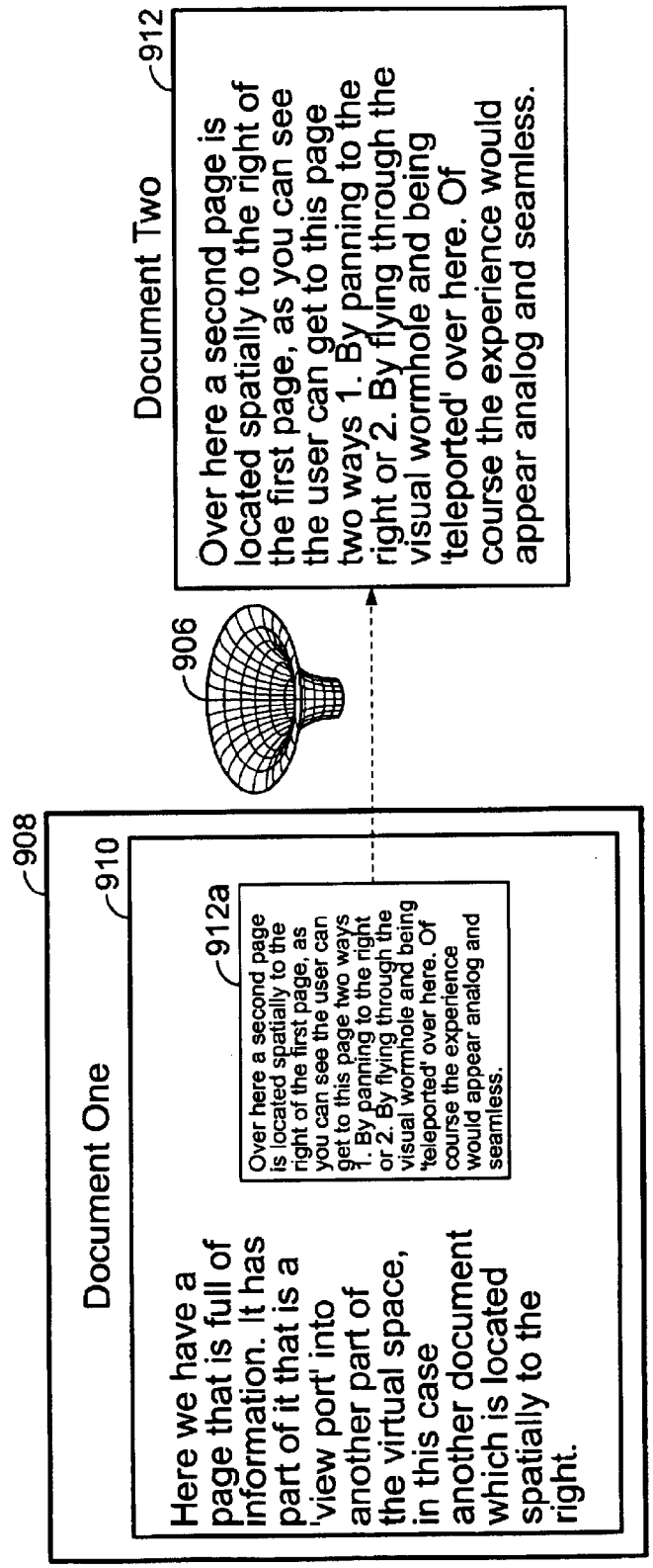
FIG. 10B illustrates operation of a visual wormhole in accordance with an embodiment of the invention.

According to another embodiment, the system 100 enables the user to warp from one data object to another through the use of a visual "wormhole." FIG. 10B illustrates the use of a wormhole 906 within the graphic appearance 908. In the graphic appearance 908, there are two data objects identified, the document 910 and a reduced version 912a of a document 912. In the spatial hierarchical relationship in the virtual space 110, the document 908 is located virtually far away from the document 912. However, the template 105 provides a connection (e.g., a hyperlink) between the two documents 910, 912. In response, the system 100 creates a wormhole 906. Since a wormhole exists, the system 100 displays the reduced version 912a (e.g., thumbnail) of the data object graphic appearance associated with the document 912 within document 908 to indicate to the user that the wormhole (e.g., hyperlink) exists. In response to the user selecting the data object 912a, the system 100 warps the user to the data object 912. As described above with respect to FIG. 10A, when warping, the system 100 displays to the user a continuous, virtual motion through all of the existing data objects between the document 908 and the document 912. However, the virtual path is direct and the user does not navigate, the system 100 automatically changes the user's viewing perspective. Of course, the user is always free to navigate to the document 912 manually.

In a further example, the user interaction with a wormhole might proceed as follows. The user is viewing data objects organized based on a template associated with a geographical paradigm. Thus, all the data objects are displayed to the user and related in the virtual space 110 according to their actual geographical location. The user is more specifically viewing businesses in Boston. One business is a travel agent, and the travel agent has an advertisement for a business in Paris. This advertisement is associated with a wormhole to the business in Paris. In one embodiment, the wormhole is indicated as a wormhole to the user by a thumbnail of what information is at the other end of the wormhole. The user zooms into the advertisement (i.e., enters the wormhole) and the system 100 changes the viewing perspective, in a continuous manner, to the city of Paris to view information regarding the Parisian business. The user can also virtually navigate to Parisian business by panning to the east across the Atlantic. Similarly, the user can pan to the west around the world to Paris. However, the wormhole provides a quick and direct route to the user's desired virtual destination. Additionally, the wormhole 906 can be uni-directional or bi-directional.

FIG. 11 is a schematic view depicting another exemplary implementation of the viewing system 100. As discussed with respect to FIG. 1, the system 100 includes an extractor module 102, a stylizer module 104, a protocolizer module 106, one ore more templates 105, user controls 107 and a display 108. FIG. 11 depicts each component 102, 104, 105, 106, 107 and 108 as individual components for illustrative clarity. However, actual physical location can vary, dependent on the software and/or hardware used to implement the system 100. In one embodiment, for example, the components 102, 104, 105 and 106 reside on a server (not shown) and components 107 and 108 reside on a client 114. In another embodiment, for example, all of the components 102, 104, 106, 107 and 108 reside on a personal computer.

The extractor module 102 is in communication with a data source 112 (e.g., a database) from which the extractor module 102 extracts data objects. The extractor module 102 converts, if necessary, the data objects into a W3C standard language format (e.g., extended markup language "XML"). The extractor module 102 uses a mapping module 116 to relate each of the data objects to each of the other data objects. In one embodiment, the mapping module 116 is an internal sub-process of the extractor module 102. The extractor module 102 is also in communication with the stylizer module 104. The extractor module 102 transmits the data objects to the stylizer module 104.

The stylizer module 104 converts the data objects from their W3C standard language format (e.g., XML) into a virtual space language format (e.g., ZML™, SZML™, referred to generally as ZML™). The ZML™ format enables the user to view the data objects from an adjustable viewing perspective in the multi-dimensional, virtual space 110, instead of the two-dimensional viewing perspective of a typical Web page. The stylizer module 104 uses one or more templates 105 to aid in the conversion. The one or more templates, hereinafter referred to as the template 105 include two sub-portions, a spatial layout style portion 105a and a content style portion 105b. The spatial layout style portion 105a relates the data objects in a hierarchical fashion according a physical paradigm. The contents style portion 105b defines how the data objects are rendered to the user. The stylizer module 104 is also in communication with the protocolizer module 106. The stylizer module 104 transmits the data objects, now in ZML™ format, to the protocolizer module 106.

The protocolizer module 106 converts the data objects to established protocols (e.g., WAP, HTML, GIF, Macromedia FLASH™) to communicate with a plurality of available clients 114 (e.g., televisions; personal computers; laptop computers; wearable computers; personal digital assistants; wireless telephones; kiosks; key chain displays; watch displays; touch screens; aircraft; watercraft; and/or automotive displays) and browsers 118 (e.g., Microsoft Internet Explorer™, Netscape Navigator™) to display the data objects from the user's viewing perspective in a navigable, multi-dimensional virtual space 110. The browser 118 is hardware and/or software for navigating, viewing and interacting with local and/or remote information. The system 100 also includes a Zoom Renderer™ 120. The Zoom Renderer™ 120 is software that renders the graphic appearances to the user. This can be, for example, a stand-alone component or a plug-in to the browser 118, if the browser 118 does not have the capability to display the ZML™ formatted data objects. Throughout the specification, the term "client" 114 is used to represent both the hardware and the software needed to view information although the hardware is not necessarily considered part of the system 100. The protocolizer module 106 communicates with the client 114 via a communication channel 122. Since the protocolizer module 106 converts the ZML™ format into an established protocol, the communication channel 122 can be any channel supporting the protocol to which the protocolizer module 106 converts the ZML™ format. For example, the communication channel 122 can be a LAN, WAN, intranet, Internet, wireless telephone network, wireless communication network (including third generation wireless devices), infrared radiation ("IR") communication channel, PDA cradle, cable television network, satellite television network, and the like.

The data source 112, at the beginning of the process, provides the content (i.e., data objects). The content of the data source 112 can be of any type. For example, the content can take the form of a legacy database (e.g., Oracle™, Sybase™, Microsoft Excel™, Microsoft Access™), a live information feed, a substantially real-time data source and/or an operating system file structure (e.g., MAC™ OS, UNIX™ and variations of UNIX™, Microsoft™ Windows™ and variations of Windows™). In another embodiment, the data source 112 can be a Web server and the content can include, for example, an HTML page, a page written in Coldfusion™ Markup Language ("CFML"), an Active Server Page ("ASP") and/or a page written for a Macromedia FLASH™ player. In another embodiment, the data source 112 can also be a Web cache device. In these cases, the content typically is not stored in the ZML™ format (i.e., "zoom-enabled"). If the content is not stored in a ZML™ format, the extractor module 102 and stylizer module 104 convert the content into the ZML™ format.

In other embodiments, the stored content is in the ZML™ format. In these embodiments, the system 100 transfers the content from the data source 112 to the extractor module 102, the stylizer module 104 and protocolizer module 106, without any additional processing. For example, if the content of the data source 112 is already in ZML™0 format, the stylizer module 104 does not need to take any action and can transmit the content directly to the protocolizer module 106.

The types of transactions processed by the data source 112 are transactions for obtaining the desired content. For example, for a legacy database, a representative input can be "get record" and the corresponding output is the requested record itself. For a file system, a representative input can be "get file(dir)" and the corresponding output is the content information of the "file/dir." For a Web site, a representative input can be "get page/part" and the corresponding output is the requested page/part itself. The system 100 transfers the output from the data source 112 to the extractor module 102.

As briefly mentioned above, the extractor module 102 receives the content from the data source 112. The extractor module 102 separates the content into pieces referred to as data objects. The extractor module 102 converts the content into a hierarchical relationship between the data objects within the content. In one embodiment, the hierarchical data structure is one that follows a common language standard (e.g., XML).

Figure 12:
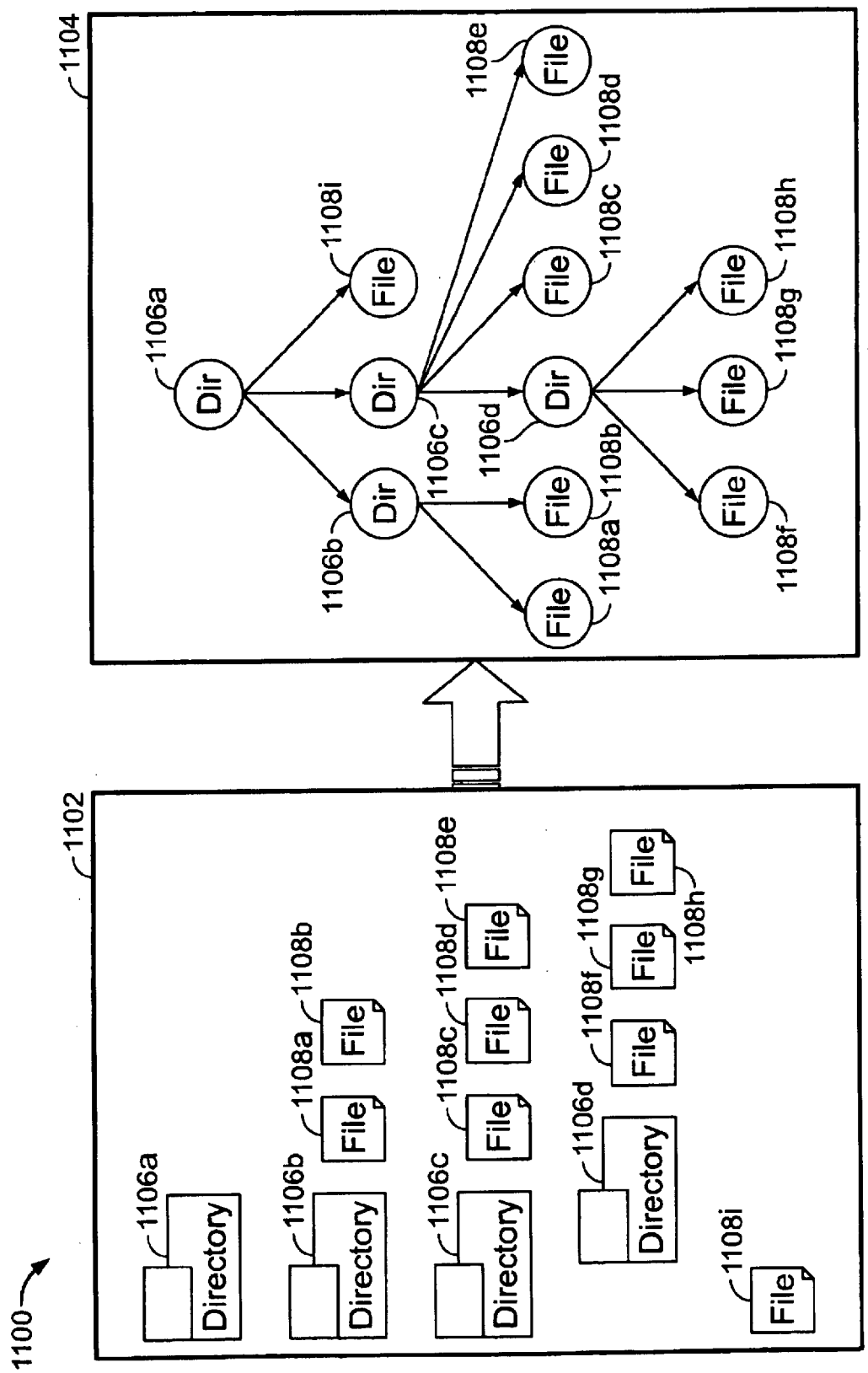
FIG. 12 is a schematic view depicting the conversion of a file system directory tree into a hierarchical structure of data objects in accordance with an embodiment of the invention.

FIG. 12 is a schematic view 1100 depicting an illustrative conversion of a file system directory tree 1102 to a hierarchical structure 1104 of data objects by the extractor module 102. The extractor module 112 relates each of the data objects, consisting of the directories 1106a–1106d and the files 1108a–1108i to each other in the hierarchical data structure 1104, illustratively represented as a node tree. In this embodiment, relationships between the nodes 1106a–1106d and 1108a–1108i of the hierarchical data structure 1104 follow the relationships depicted in the directory tree 1102.

The types of transactions processed by the extractor module 102 are transactions for converting the obtained content to data objects in a hierarchical data structure, for example, XML. For example, for a legacy database, representative inputs to the extractor module 102 can be data record numbers and mapping, if the database already contains a mapping of the data objects. A representative command can be, for example, "get_record(name)|get_record(index)." The corresponding output from the extractor module 102 is an XML data structure of the data objects. For a file system, for example, a representative input can be filename(s), with representative commands such as "get_file(directory, name)" and "get_file_listing(directory)." For a Web site, a representative input can be Web pages/parts, with a representative command such as "get_Web_content (URL, start tag, end tag)."

By way of further example, the extractor module 102 analyzes the content to convert the content to create an exemplary structure such as:

```
struct
{
    void* data...
    node* parent
    node* child[ren]
}node;
```

As mentioned above, to create the exemplary structure, the illustrative extractor module 102 uses the mapping module 116. Operation of the mapping module 116 depends on the type of content received by the extractor module 102. For example, for a file structure, the mapping module 116 traverses the directory tree until it creates a node for each file (i.e., data object) and each directory (i.e., data object) and creates the appropriate parent-child relationship between the nodes (i.e., data objects). FIG. 12 illustrates how the mapping module 116 follows the directory tree 1102 when creating the hierarchical data structure 1104. For some databases, the mapping module 116 keeps the hierarchical relationships of data objects as they are in the data source. For example, a retail store might organize its contents in, for example, an Oracle™ database and into logical categories and sub-categories forming a hierarchical data structure that the mapping module 116 can copy. Another database might be, for example, a list of geographic points. The mapping module 116 can use geographical relationship to create the hierarchical relationship between the points.

In other databases, there are no hierarchical relationships between data objects. In that case, the mapping module 116 creates them. In other databases, such as for example, a flat list of names and personal information, the hierarchical structure may be less evident. In that case, the mapping module 116, preferably, creates the relationships using some predetermined priorities (e.g., parent nodes are state of residence first, then letters of the alphabet).

If the content is Web-related content, the mapping module 116 extracts the vital information by first determining the flow or order of the Web site. To zoom enable a typical Web site, the mapping module 116 extracts from the Web site a data hierarchy. HTML pages are a mix of data and formatting instructions for that data. HTML pages also include links to data, which may be on the same page or a different page. In one embodiment, the mapping module 116 "crawls" a Web site and identifies a "home" data node (for example, on the home page) and the name of the company or service. Next, the mapping module 116 identifies the primary components of the service such as, for example, a table of contents, along with the main features such as "order," "contact us," "registration," "about us," and the like. Then the mapping module 116 recursively works through the sub-sections and sub-subsections, until it reaches "leaf nodes" which are products, services, or nuggets of information (i.e., ends of the node tree branches).

This process determines critical data and pathways, stripping away non-essential data and creating a hierarchical tree to bind the primary content. This stripping down creates a framework suitable for zooming, provides the user with a more meaningful focused experience, and reduces strain on the client/server connection bandwidth.

Figure 13:
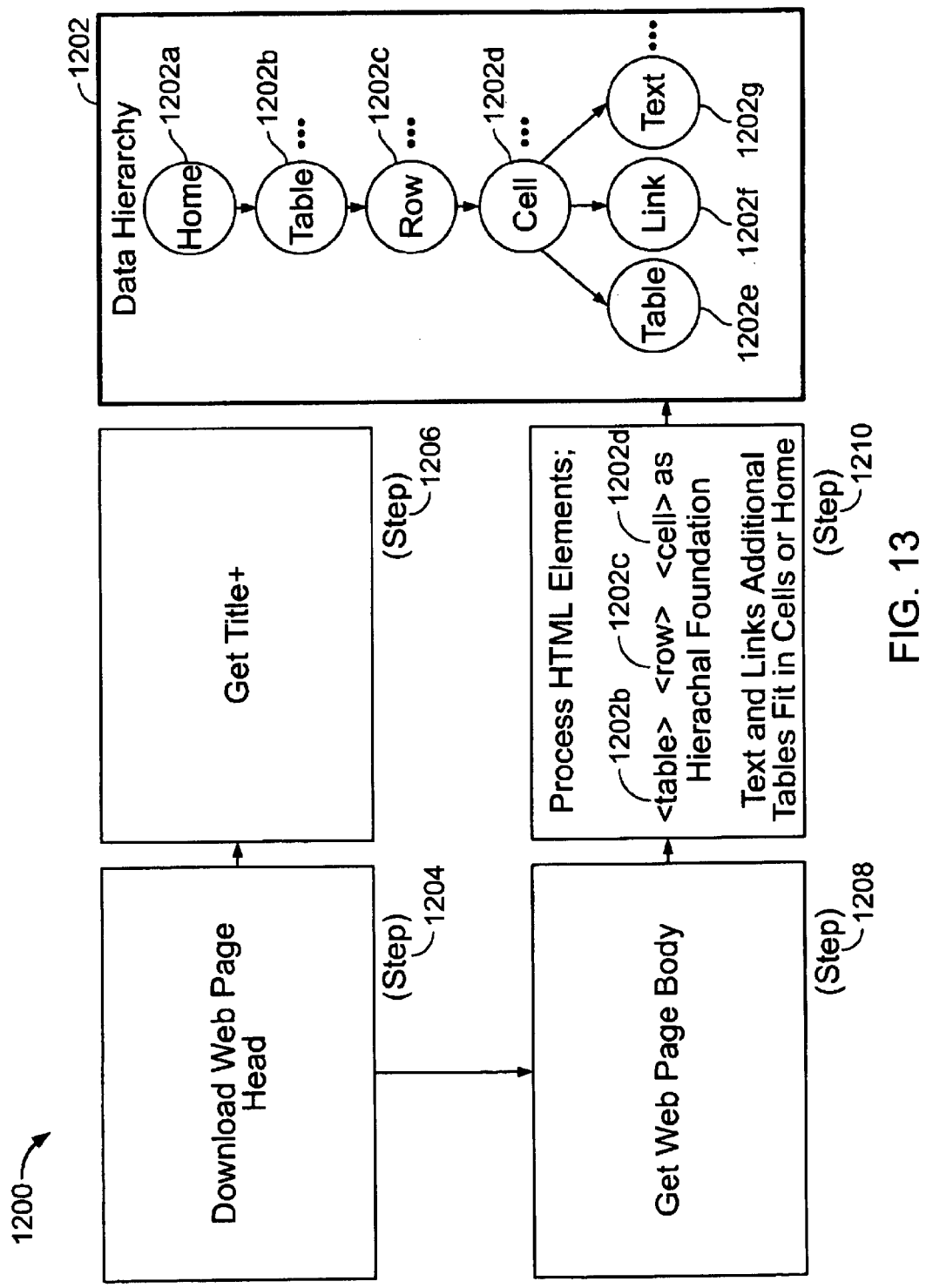
FIG. 13 is a schematic view depicting the conversion of a Web page to a hierarchical structure of data objects in accordance with an embodiment of the invention.

FIG. 13 is a flow diagram 1200 illustrating operation of an exemplary embodiment of the extractor module 102 process for converting a Web page to a hierarchical data structure 1202. The extractor module 102 downloads (step 1204) the Web page (e.g., HTML document). From the contents between the Web page <head> </head> tags, the mapping module 116 obtains (step 1206) the title and URL information and uses this information as the home node 1202a (i.e., the root node). The extractor module 102 also obtains (step 1208) the contents between the Web page <body> </body> tags. The mapping module 116 processes (step 1210) the HTML elements (e.g., 1202b–1202g) to create the hierarchical structure 1202. For example, as shown, the first HTML element encountered is a table 1202b. The table 1202b includes a first row 1202c. The first row 1202c includes a first cell 1202d. The first cell 1202d includes a table 1202e, a link 1202f and some text 1202g. As the mapping module 116 traverses (step 1210) the HTML elements, it forms the hierarchical structure 1202. Any traversal algorithm can be used. For example, the mapping module 116 can proceed, after obtaining all of the contents 1202e–1202g of the first cell 1202d of the first row 1202c, to a second cell (not shown) of the first row 1202c. This traversal is repeated until all of the HTML elements of the Web page have been processed (step 1210) and mapped into the hierarchical structure 1202.

In another embodiment, the extractor module 102 extracts each displayable element from a Web page. Each element becomes a data object. The mapping module 116, preferably, creates a hierarchical relationship between the data objects based on the value of the font size of the element. The mapping module 116 positions those data objects (e.g., HTML elements) with a larger value font size higher in the hierarchical relationship than those data objects with a smaller value font size. Additionally, the mapping module 116, preferably, uses the location of each element in the Web page as a factor in creating the hierarchical relationship. More particularly, the mapping module 116 locates those elements that are next to each other on the Web page, near each other in the hierarchical relationship.

Figure 14:
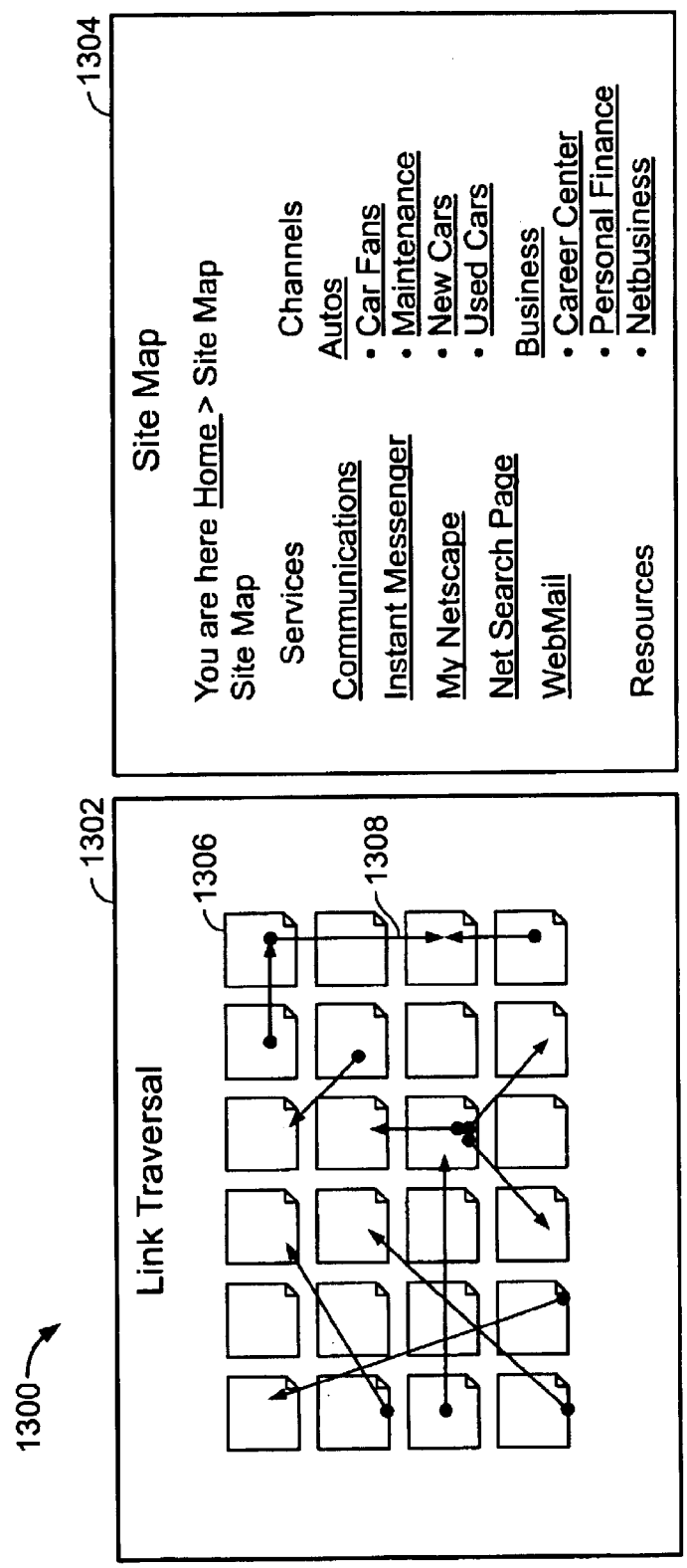
FIG. 14 is a schematic view depicting the conversion of a Web page to a hierarchical structure of data objects in accordance with an embodiment of the invention.

In another embodiment, to further help extract the vital information from Web sites, the mapping module 116 uses techniques such as traversing the hyperlinks, the site index, the most popular paths traveled and/or the site toolbar, and parsing the URL. FIG. 14 is a diagram 1300 illustrating two of these techniques; traversing the hyperlinks 1302 and the site index 1304. In the illustrative example, the mapping module 116 traverses the hyperlinks 1302 to help create a hierarchy. During this process, the mapping module 116 tracks how each page 1306 relates to each link 1308, and essentially maps a spider web of pages 1306 and links 1308, from which the mapping module 116 creates a hierarchy. The mapping module 116 can also use the site map 1304 and tool bars when those constructs reveal the structure of a Web site. As discussed above, the mapping module 116 can also use the size of the font of the elements of the site map 1304, along with their relative position to each other, to create a hierarchy.

Additionally, the mapping module 116 can parse the URL to obtain information about the Web site. Typically, URLs are in the form http://www.name.com/dir1/dir2/file.html. The name.com field generally indicates the name of the organization and the type of the organization (.com company, .cr for Costa Rica, .edu for education and the like). The dir1 and dir2 fields provide hierarchical information. The file.html field can also reveal some information, if the file name is descriptive in nature, about the contents of the file.

The mapping module 116 can also access information from Web sites that track the popularity of URL paths traveled. Such sites track which links and pages are visited most often, and weights paths based on the number of times they are traversed. The illustrative mapping module 116 uses the information obtained from such sites, alone or in combination with other relationship information gained with other techniques, to create the hierarchical relationships between extracted data objects.

Once the mapping module 116, working in conjunction with the extractor module 102, creates a hierarchical data structure for the extracted data objects, the extractor module 102 processes the data objects of the content in terms of their relationship in the hierarchy. In one embodiment, a W3C standard language data structure (e.g., XML) is used to create a platform and vendor independent data warehouse, so that the rest of the system 100 can read the source content and relate the data objects of the content in virtual space 110.

The types of transactions processed by the extractor module 102 are transactions relating to obtaining the hierarchical relationships between data objects. For example, for node information, a representative input can be "get node [x]" and the corresponding output is the requested node[x] itself. For data information, a representative input can be "get data" and the corresponding output is the requested data itself. For parent information, a representative input can be "get parent" and the corresponding output is the requested parent itself. For child information, a representative input can be "get child[x]" and the corresponding output is the requested child[x] itself. The extractor module 102 provides the output (i.e., the XML data structure) to the stylizer module 104.

As mentioned briefly above, the stylizer module 104 converts the data objects from the extractor module 102 into ZML™ format. The stylizer module uses one or more templates 105, which are related to one or more physical paradigms, to aid in the conversion. The template 105 includes two sub-portions, the spatial layout style portion 105a and the contents style portion 105b. The spatial layout style portion 105a relates the data objects in a hierarchical fashion according to a physical paradigm. The contents style portion 105b defines how the data objects are rendered to the user.

The stylizer module 104 can be implemented using any of a plurality of languages, including but not limited to JAVA™, C, XML related software, layout algorithms, GUI-based programs, and C and Macromedia FLASH™ compatible programs. The stylizer module 104 receives data objects from the extractor module 102 and converts the data objects from an XML format to the ZML™ format. The ZML™ format generated by the stylizer 104 is analogous to HTML, except designed for the multi-dimensional virtual space 110. The ZML™ format employs a mark up language that describes one or more of the data objects organized within the virtual space. Like HTML, ZML™ format uses tags to describe the attributes of, for example, the conceptual plates 204a–204c discussed above with respect to FIG. 2. Illustratively:

| <Tags> | Attributes |
| --- | --- |
| <plate> | x, y, z, width, height, depth |
| <raster> | URL |
| <vector> | URL |
| <text> | font, size, justify |
| <link> | URL |

The stylizer module 106 uses one or more templates 105 to generate ZML™ formatted data objects. As discussed above, templates describe how data objects from a data source are arranged in the multi-dimensional virtual space 110. Templates include a plurality of properties relating to a physical paradigm.

The following list contains some exemplary properties of a template relating to a financial paradigm. Specifically, the list of properties is for a section of the template 105 for viewing a stock quote including historical data, news headlines and full text.

```
p=parent
j=justify
n=name
ab=all_borders
cx=children_x
bb=bottom_border
tb=top_border
lb=left_border
rb=right_border
cb=cell_border
fow=fade_out_on_width
fiw=fade_in_on_width
zt=zoom_to
bt=border_thickness
t=title
lbi=left_border_internal
rbi=right_border_internal
w=wrap
pv=plot_val
pyl=plot_y_label
pmx=plot_min_x
pxx=plot_max_x
pmy=plot_min_y
pxy=plot_max_y
```

Each property in the list is limited to a few letters to save memory for use in handheld devices and/or other low capacity (e.g. bandwidth, processor and/or memory limited) devices.

The template properties listed above describe characteristics of the information relating to the exemplary financial paradigm and displayed to the user in the virtual space 110. Some properties describe visibility. For example, the fade properties describe when the appearance of data objects on a hierarchical plate comes within the viewing perspective (e.g., becomes visible to the user). Properties can also describe the appearance of included text. For example, some properties describe how the text appears, whether the text is wrapped, how the text is justified and/or whether the text is inverted. Properties can also describe dimensions of the data objects on the plate. For example, some properties describe whether the data object of the focus node has any borders and/or how the data objects corresponding to any children nodes are arranged. The focus node is the node corresponding to the data object virtually closest to the current viewing perspective location. Properties can further describe the appearance of the data object on the hierarchical plate. For example, some properties describe whether the hierarchical plate contains charts and/or maps and/or images.

Templates also contain a plurality of placeholders for input variables. The following list includes illustrative input variables for the exemplary financial template. The input variables describe parameters, such as high price, low price, volume, history, plots and labels, news headlines, details, and the like.

```
$q$           (name)
$s_td$        (last)
$o_td$        (open)
$v_td$        (volume)
$h_td$        (high)
$l_td$        (low)
$c_td$        (change)
$b_td$        (bid)
$a_td$        (ask)
$pv_td$       (today's prices)
$pmx_3m$      (3 month t0)
$pxx_3m$      (3 month t1)
$h_3m$        (3 month price high)
$l_3m$        (3 month price low)
$pv_3m$       (3 month prices)
$pmx_3m$      (6 month t0)
$pxx_3m$      (6 month t1)
$h_3m$        (6 month price high)
$l_3m$        (6 month price low)
$pv_3m$       (6 month prices)
$pmx_1y$      (1 year t0)
$pxx_1y$      (1 year t1)
$h_1y$        (1 year price high)
$l_1y$        (1 year price low)
$pv_1y$       (1 year prices)
$pmx_5y$      (5 year t0)
$pxx_5y$      (5 year t1)
$h_5y$        (5 year price high)
$l_5y$        (5 year price low)
$pv_5y$       (5 year prices)
$nzh1$        (new headline 1)
$nzh2$        (new headline 2)
$nzh3$        (new headline 3)
$nzd1$        (new detail 1)
$nzd2$        (new detail 2)
$nzd3$        (new detail 3)
```

The SZML™ format is similar to ZML™ format, except instead of plates, the SZML™ format describes attributes of the appearance in terms of a screen display. The SZML™ format is the ZML™ format processed and optimized for display on a reduced sized screen. One advantage of the SZML™ format is that when zooming and panning, the user tends to focus on certain screen-size quantities of information, regardless of what level of hierarchical abstraction the user is viewing. In other words, when the user wants to look at something, the user wants it to be the full screen. For example, in a calendar program the user may want to concentrate on a day, a week or a year. The user wants the screen to be at the level on which the user wants to concentrate.

The SZML™ format is vector based. Vector graphic appearances enable the appearance of data objects to be transmitted and displayed quickly and with little resources. Using the SZML™ format gives the user a viewing experience like they are looking at a true three dimensional ZML™ formatted environment, while in reality the user is navigating a graphical presentation optimized for a reduced size two-dimensional display. In the illustrative embodiment, the SZML™ format provides the content author ultimate and explicit control of what the appearance user sees on the screen. In the illustrative embodiment, the SZML™ format is based on 'Screens' described by a series of vector graphic appearance elements such as rectangles, text, axes and polygons. The SZML™ elements are described by a mark-up language, and as such, uses tags to describe attributes. For example:

```
<text>    title=$str$
          justify=int
          wrap=int
          format=int
```

-continued

```
<axes>    x_label=$str$
          x_low=$str$
          x_high=$str$
          y_label=$str$
          y_low=$str$
          y_high=$str$
<polygon> points=$int$
values='$int$,$int$ $int$,$int$ $int$,$int$ ...' //$int$=0...99
<void>
<rect> coordinates='$int$,$int$ $int$,$int$ $int$,$int$ $int$,$int$ '
<*all*>   name=$str$
          zoom_to=$str$
          coordinates='$int$,$int$ $int$,$int$ $int$,$int$ $int$,$int$ '
```

The <*all*> tag is not a separate tag, but shows attributes for each element, regardless of the type of the element. Each element has a name, rectangular bounds, and potentially a 'zoom to' attribute, which when clicked will transport the user to another screen.

To increase the speed at which the data is transmitted, decrease the bandwidth requirements and decrease the storage capacity needed, the SZML™ tags can be reduced to one or two characters. The attributes listed above, for example, can be reduced as follows:

| T = text | t | = | title |
| | j | = | justify |
| | f | = | format |
| | w | = | wrap mode |
| A = axes | x | = | x_label |
| | xl | = | x_low |
| | xh | = | x_high |
| | y | = | y_label |
| | yl | = | y_low |
| | yh | = | y_high |
| P = Polygon | s | = | points |
| | v | = | values |
| R = rect | c | = | coordinates |
| All | | | |
| | n | = | name |
| | z | = | zoom_to |
| | c | = | coordinates |

To further improve data transmission, SZML™ formatted text may be compressed before transmission and decompressed after reception. Any known compression/decompression algorithms suffice.

The SZML™ format stores and relates data objects as screens, and stores a plurality of full screens in memory. In SZML™ formatted information, each screen has travel regions (e.g., click regions) which are 'zoom-links' to other screens. When the user clicks on the 'click region', the viewing perspective zooms from the currently viewed screen to the "zoom_to" screen indicated in the attributes of the screen. For zooming, screens can be thought of as containing three states; small (e.g., 25% of normal display), normal (e.g., 100%) and large (e.g., 400% of normal display).

When zooming in, the focus screen (the screen currently being displayed) transitions from normal to large (e.g., from 100% of normal display to 400% of normal display). Subsequently, approximately when the 'click region' reaches its small state (i.e., 25% of normal display), the "zoom-to" screen is displayed and transitions from small to normal (e.g., 25% of normal display to 100% of normal display). Subsequently, approximately when the focus screen reaches its large state and prior to the clicked screen reaching its normal state, the focus screen is no longer displayed in the appearance. This gives the appearance to the user of zooming into the 'click region' (which expands) through the focus screen (which also expands). Illustratively, the expansion is linear, but this need not be the case.

When zooming out, the focus screen (the screen currently being displayed) transitions from normal to small (e.g., from 100% of normal display to 25% of normal display). Subsequently, the parent screen transitions from large to normal (e.g., 400% of normal display to 100% of normal display) and at some point in time, the focus screen is no longer displayed. This gives the appearance to the user of zooming out of the focus screen (which contracts) to the parent screen (which also contracts). Illustratively, the contraction is also linear. However, it also need not be the case. There is no need for a three-dimensional display engine since the graphic appearances can be displayed using a two-dimensional display engine. Yet, the user still receives a three-dimensional viewing experience.

When panning, screens are modeled as a pyramidal structure based on hierarchy level and relative position of parent screens within the pyramid. For example, each screen can have a coordinate (x, y, z) location. The z coordinate corresponds to the hierarchical level of the screen. The x, y coordinates are used to indicated relative position to each other, base on where the parent screen is. For example, refer to the appearances of data objects 1804 and 1810 of FIG. 18. In the parent screen 1804, the "news" data object element is to the right of the "charts" data object element. The user changes the viewing perspective to the hierarchical level corresponding with the appearance 1810. The user can pan at this level. When panning right at this lower hierarchical level, the screen to the right is a more detailed screen, at that particular hierarchical level, of the travel region of the "news" data object element.

One embodiment of the viewing system 100 addresses low bandwidth, memory and processor limited clients 114. With high bandwidth and performance, these features become somewhat less critical, but are still very useful. Described above is an illustrative embodiment of the SZML™ format, which is essentially the ZML™ format transformed and optimized for direct screen display. The SZML format defines graphic appearances as vectors. The SZML™ format is much faster and simpler to render than the ZML™ format.

Figure 15:
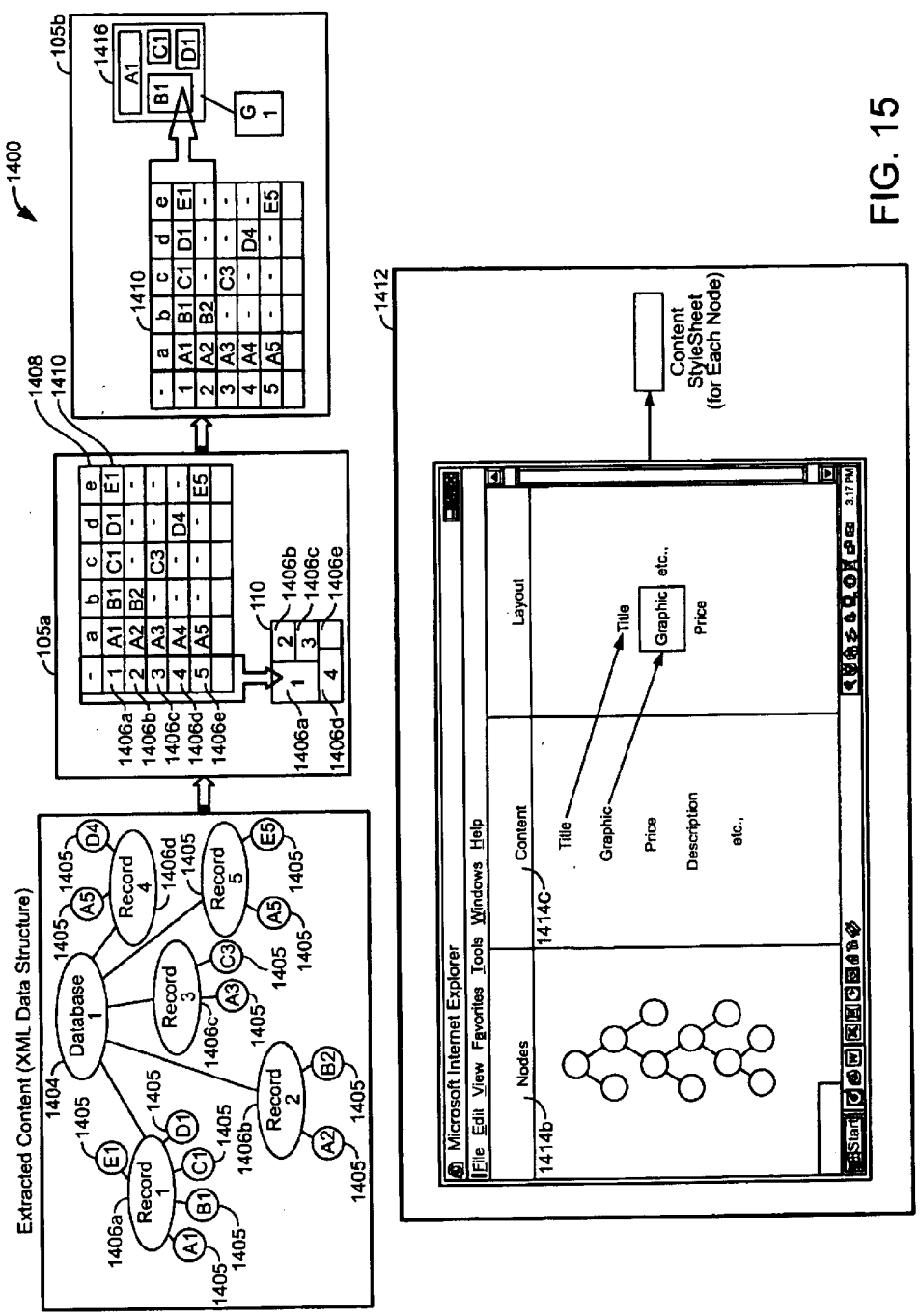
FIG. 15 is a schematic diagram depicting the conversion of an XML hierarchical structure of data objects to the ZML™ format in accordance with an embodiment of the invention.

As mentioned above, the stylizer module 104 employs the template 105 having a spatial layout portion 105a and a contents style portion 105b. FIG. 15 is a block diagram 1400 illustrating how the spatial layout style portion 105a and the contents style portion 105b of the template 105 operate to enable the stylizer module 104 to convert an XML source content data structure extracted from a data source 1404 into ZML™ formatted data objects. The spatial layout style portion 105a arranges a plurality of data records 1406a–1406e in the multi-dimensional, virtual space 110 independent of the details 1405 in each of the records 1406a–1406e. For example, if the source content 1404 is a list of a doctor's patients, the spatial layout style portion 105a arranges the records 1406a–1406e, relative to each other, in the virtual space 110 based on the person's name or some other identifying characteristic. The spatial layout style portion 105a generally does not deal with how the data 1405 is arranged within each record 1406a–1406e. As previously discussed, the nature of the arrangement (e.g., mapping) is variable, and relates to a particular physical paradigm. This mapping, in one embodiment, translates to a function wherein the three-dimensional coordinates of the data objects are a function of the one-dimensional textual list of the data objects and the template 105.

After the spatial layout style portion 105a assigns the records 1406a–1406e to locations in the virtual space 110, the contents style portion 105b determines how to render each record detail 1405 individually. A shoe store, a Web search engine, and a hotel travel site, for example, typically would all display their individual products and/or services and thus, record details 1405, differently. The contents style portion 105b creates the user-friendly style, and arranges the data 1405 within each record 1406a–1406e. Referring back to the patient example, the contents style portion 105b arranges the patient's information within a region 1416 (e.g., a plate), placing the title A1 on top, the identification number B1 of the patient over to the left, charts in the middle and other information D1 in the bottom right corner.

The system 100, optionally, provides a graphical interface 1412 for enabling the user to modify the template 105 easily. As depicted, the interface 1412 includes a display screen 1413. The display screen 1413 includes a portion 1414a that enables the user modify hierarchical connections. The display screen 1413 also includes a portion 1414b that enables the user to change the content of particular data nodes, and a portion 1414c that enables the user to change the display layout of particular data nodes. This enables the user to edit the definitions of data objects defined in ZML™ or SZML™ format, without the need of the user to understand those formats. The interface 1412 enables the user to change the zoomed layout of data objects manually like a paint program. The user selects graphic appearance tools and then edits the ZML™ or SZML™ formatted information by manually using the interface 1412. For example, if there was special of the week, the user manually selects that node that corresponds to the data object representing the special of the week and using the tools 1414a–1414c, makes modifications. Also, the user can use the interface 1412 to go beyond the layout algorithm and design the look and feel of the virtual space with greater control. The graphical alteration interface 1412 operates in combination with the automated layout.

Once the stylizer module 104 has arranged all of the data objects spatially using the template 105, the data objects are now in ZML™ format, and the have a location in the multi-dimensional, virtual space 110. The stylizer module 104 transfers the data objects in ZML™ format to the protocolizer module 106 for further processing.

The protocolizer module 106 receives the data objects in the ZML format and transforms the data objects to a commonly supported protocol such as, for example, WAP, HTML, GIF, Macromedia FLASH™ and/or JAVA™. The protocolizer module 106 converts the data objects to established protocols to communicate with a plurality of available clients 114 and browsers 118 to display the data objects from an adjustable viewing perspective in the navigable, multi-dimensional, virtual space 110. For example, a Macromedia FLASH™ player/plug-in is available in many browsers and provides a rich graphical medium. By translating the ZML™ formatted data objects to Macromedia FLASH™ compatible code, the data objects in the spatial hierarchy (i.e., ZML™ format) can be browsed by any browsers with a Macromedia FLASH™ player/plug-in, without any additional software.

In one embodiment, the protocolizer module 106 is implemented as a servlet utilizing JAVA™, C, WAP and/or ZML formatting. The protocolizer module 106 intelligently delivers ZML™ formatted data objects as needed to client 114. The protocolizer module 106 preferably receives information regarding the bandwidth of the communication channel 122 used to communicate with the client 114. In the illustrative embodiment, the protocolizer module 106 delivers those data objects that are virtually closest to the user's virtual position. Upon request from the Zoom Renderer™ 120, the protocolizer module 106 transmits the data objects over the communication channel 122 to the client 114.

An example illustrating operation of the protocolizer module 106 involves data objects relating to clothing and a template 105 relating to the physical paradigm of a clothing store. Due to the number of data objects involved, it is unrealistic to consider delivering all the data objects at once. Instead, the protocolizer module 106 delivers a virtual representation of each data object in a timely manner, based at least in part on the virtual location and/or viewing perspective of the user. For example, if the user is currently viewing data objects relating to men's clothing, then the protocolizer module 106 may deliver virtual representations of all of the data objects relating to men's pants and shirts, but not women's shoes and accessories. In a model of the data objects as a node tree, such as depicted in FIGS. 4A–4C, the focus node 402c is the node corresponding to the data object appearance 406c displayed from the current viewing perspective shown by the camera 416a. The protocolizer module 106 delivers to the client 114 those data objects that correspond to the nodes virtually closest the user's focus node 402c and progressively delivers data that are virtually farther away. As discussed with regard to FIGS. 4A–4C, the system 100 employs a variety of methods to determine relative nodal proximity.

For example, referring once again to FIG. 4A, while the user is viewing the data object of node 402c, the protocolizer module 106 delivers those nodes that are within a certain radial distance from the focus node 402c. If the user is not moving, the protocolizer module 106 delivers nodes 402a, 402b, 402d and 402e, which are all an equal radial distance away. As also discussed with regard FIG. 4A, calculating virtual distances between nodes can be influenced by the hierarchical level of the nodes and also the directness of the relationship between the nodes. As skilled artisans will appreciate, the importance of prioritizing is based at least in part on the bandwidth of the communication channel 122.

The Zoom Renderer™ 120 on the client 114 receives the data transmitted by the protocolizer module 106 authenticates data via checksum and other methods, and caching the data as necessary. The Zoom Renderer™ 120 also tracks the location of the user's current viewing perspective and any predefined user actions indicating a desired change to the location of the current viewing perspective, and relays this information back to the protocolizer module 106. In response to the viewing perspective location information and user actions from the Zoom Renderer™ 120, the protocolizer module 106 provides data objects, virtually located at particular nodes or coordinates, to the client 114 for display. More particularly, the Zoom Renderer™ 120 tracks the virtual position of the user in the virtual space 110. According to our feature, if the user is using a mobile client 114, the Zoom Renderer™ 120 orients the user's viewing perspective in relation to the physical space of the user's location (e.g., global positioning system ("GPS") coordinates).

The user can influence which data objects the protocolizer module 106 provides to the client 114 by operating the user controls 107 to change virtual position/viewing perspective. As discussed above, delivery of data objects is a function of virtual direction (i.e. perspective) and the velocity with which the user is changing virtual position. The protocolizer module 106 receives user position, direction and velocity information from the Zoom Renderer™ 120, and based on this information, transmits the proximal data node(s). For example, in FIG. 4A, if the user is at node 402c and virtually traveling toward nodes 402e and 402h, the protocolizer module 106 delivers those nodes first.

As previously mentioned, the client 114 can be any device with a display including, for example, televisions, a personal computers, laptop computers, wearable computers, personal digital assistants, wireless telephones, kiosks, key chain displays, watch displays, touch screens, aircraft watercraft or automotive displays, handheld video games and/or video game systems. The system 100 can accommodate any screen size. For example, clients 114 such as personal digital assistants, a wireless telephones, key chain displays, watch displays, handheld video games, and wearable computers typically have display screens which are smaller and more bandwidth limited than, for example, typical personal or laptop computers. However, the stylizer module 104 addresses these limitations by relating data objects in the essentially infinite virtual space 110. The essentially infinite virtual space 110 enables the user to view information at a macro level in the restricted physical display areas to pan through data objects at the same hierarchical level, and to zoom into data objects to view more detail when the desired data object(s) has been found. Bandwidth constraints are also less significant since the protocolizer module 106 transfers data objects to the client 114 according to the current location and viewing perspective of the user.

The Zoom Renderer™ 120 processes user input commands from the user controls 107 to calculate how data objects are displayed and how to change the users position and viewing perspective. Commands from the user controls 107 can include, for example, mouse movement, button presses, keyboard input, voice commands, touch screen inputs, and joystick commands. The user can enter commands to pan (dx, dy), to (dz), and in some embodiments to rotate. The user can also directly select items or various types of warping links to data objects whereupon the user automatically virtually travels to selected destination.

The Zoom Render™ 120 and the browser 118 can be implemented in a variety of ways, depending on the client platform. By way of example, for PCs and Kiosks, JAVA™ can be used with, for example, graphic appearance libraries or a custom library with or without the JAVA Graphics™ API to create the Zoom Renderer™ 120 and/or browser 118 for displaying the ZML™ formatted data objects in the virtual viewing space 110. Alternatively, a custom C library can be used to create a stand-alone browser or plug-in. In another embodiment, Macromedia FLASH™ compatible code can be employed. For the PALM™ handheld, C software, the PALM™ Development Environment and PALM OS™ software can be employed. For wireless telephones, the Zoom Renderer™ 120 and/or browser 118 can be implemented in the language of the telephone manufacturer. For televisions, the Zoom Renderer™ 120 and/or browser 118 can be implemented within a cable receiver or an equivalent service.

The Zoom Renderer™ 120 may reside on devices that are limited in capacity such as vehicle computers, key chains, and PDAs with limited memory and processing capabilities. Such devices often have limited and strained network bandwidth and are not designed for complicated graphic appearances. They may not have a typical browser 118 that a personal computer would have. The following techniques help provide a high bandwidth experience over a low bandwidth connection (i.e., expensive experience over inexpensive capabilities). One goal of the following techniques are to keep the size of the code small, including a small stack and a small heap, using the heap over the stack. Another goal is to provide rapid graphic appearances with simple routines and small memory requirements. The following techniques can be variously combined to achieve desired goals.

One technique is for use with the ZML™ format. This technique uses parent-child relationships as impetus to minimize the need to specify explicit coordinates. It can be accomplished using a recursive table-like layout propagated over three-dimensional space. The table-like layout can contain n children per row, outside cell border percentages, intra cell border percentages, zoom-to, no screens. In the absence of explicit coordinates for ZML™ objects, a table layout may be employed within the ZML™ properties, such as children per row and outside, inside border percentages. Tables may be nested within tables. This method is analogous to HTML table layouts. The goal is to provide, at any given zoom level, a reasonable number of choices and a coherent display of information. Even though data objects are related to each other using a recursive, table-like layout, the coordinate system placement is not replaced entirely. This provides to the ability to place plates explicitly, independent of any parent or child.

Another technique is to get as much as possible off of the end device (e.g., thin client) by performing these conversion steps on another, more powerful CPU, starting with the system storing, in ZML™ format, a collection of one or more data objects. Then the system 100 takes the ZML™ format (ASCII) as an input and generates virtual plate structures from the ZML™ formatted data objects. The system 100 generates screens structures from the hierarchical plates. The system 100 generates, from screens, SZML™ formatted data objects (ASCII form) as output. The end result is a text file in SZML™ format that can be pasted into a PDA. This end result is a PDA application that does not have plate structures, screen structures, plate conversion function from ZML™ format, plate conversion functions to screens, and screen conversion functions to SZML™ format. Without these functions, the software is cheaper and faster.

Another technique is to truncate the ZML™ format to abbreviations (1–3 letters) to reduce characters as discussed above, for example:

--- bt=border thickness
n=name
p=parent

---

Another technique is to compress the ZML™/SZML™ format and uncompress on the other side. The system 100 uses a compression algorithm to compress ZML™ or SZML™ into a CZML™ or CSZML™ format. The system 100 decompresses to ZML™ or SZML™ format at the other side.

Another technique is to preprocess the ZML™ to SZML™ format on another CPU format or store data objects in SZML™ format. However, there is a tradeoff. SZML™ formatted data objects have more characters because is the SZML™ format is essentially the ZML™ format expanded into its actual renderable elements, and thus it is larger. For example, it is one thing to describe the shape of a tea pot of size a, b, c and position x, y, z (i.e., ZML™ format) and it is another to describe every polygon in the tea pot (i.e., SZML™ format). The advantage is that SZML™ format is immediately ready for display. For example, where ZML™ format defines the existence of a rectangle in three-dimensional space and it is titled, located at this angle, and the like, SZML™ format explicitly commands the Zoom Renderer™ 120 to draw the rectangle at screen coordinates (10, 20, 50, 60).

According to another technique, the system 100 summarizes ZML™ formatted information into screens; that is a collection of M×N displays on which the user would typically focus. Each screen is a list of vector graphic appearance objects. The system 100 then smoothly transitions between source and destination screens by linearly scaling the current view, followed by the destination view, as described above. This creates the effect of a true three-dimensional camera and graphic appearances engine (typically expensive) using primitive, inexpensive two-dimensional graphic appearances techniques.

According to another technique, the system 100 does not download everything, at once. Instead, the system 100 downloads the template(s) once and then subsequently only downloads irreproducible data. For example, if an appearance is defined by the example list of input variables for the exemplary financial template above, only the data for each data object is transmitted for the Zoom Renderer™ 120 to display the data object. The layout of the appearance, the template, remains the same and the Zoom Renderer™ 120 only changes the displayed values associated with each data object.

In addition to the software being ideal for many platforms, other hardware devices can augment the user experience. Since ZML™ and SZML™ formatted data can be lightweight (e.g., quick transmission and low memory requirements) using some of the compression/conversion algorithms, a PDA is an applicable client device 114 for the system 100.

Figure 16:
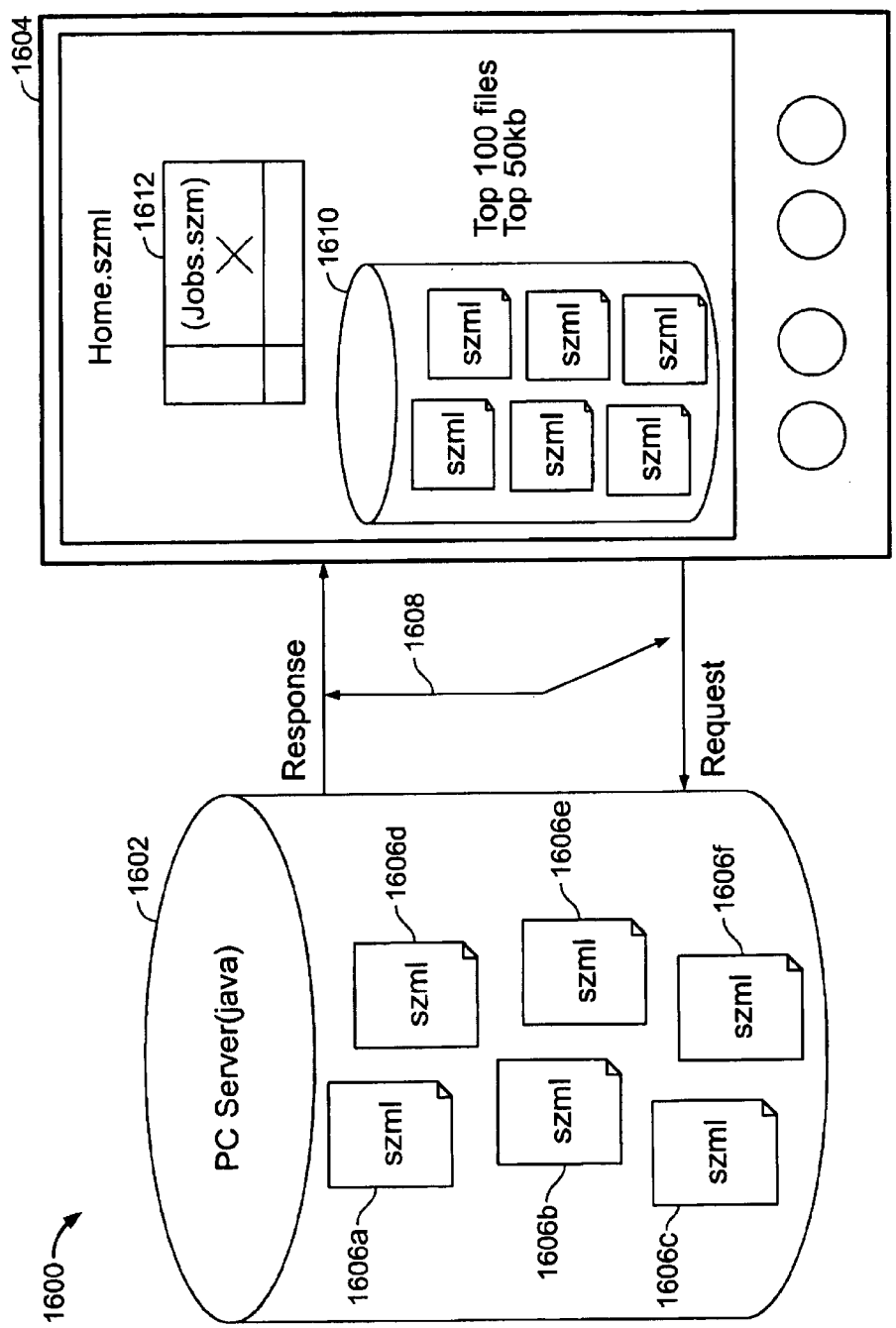
FIG. 16 depicts a method of downloading data from/to a server to/from a PDA client, respectively, in accordance with an embodiment of the invention.
Figure 17:
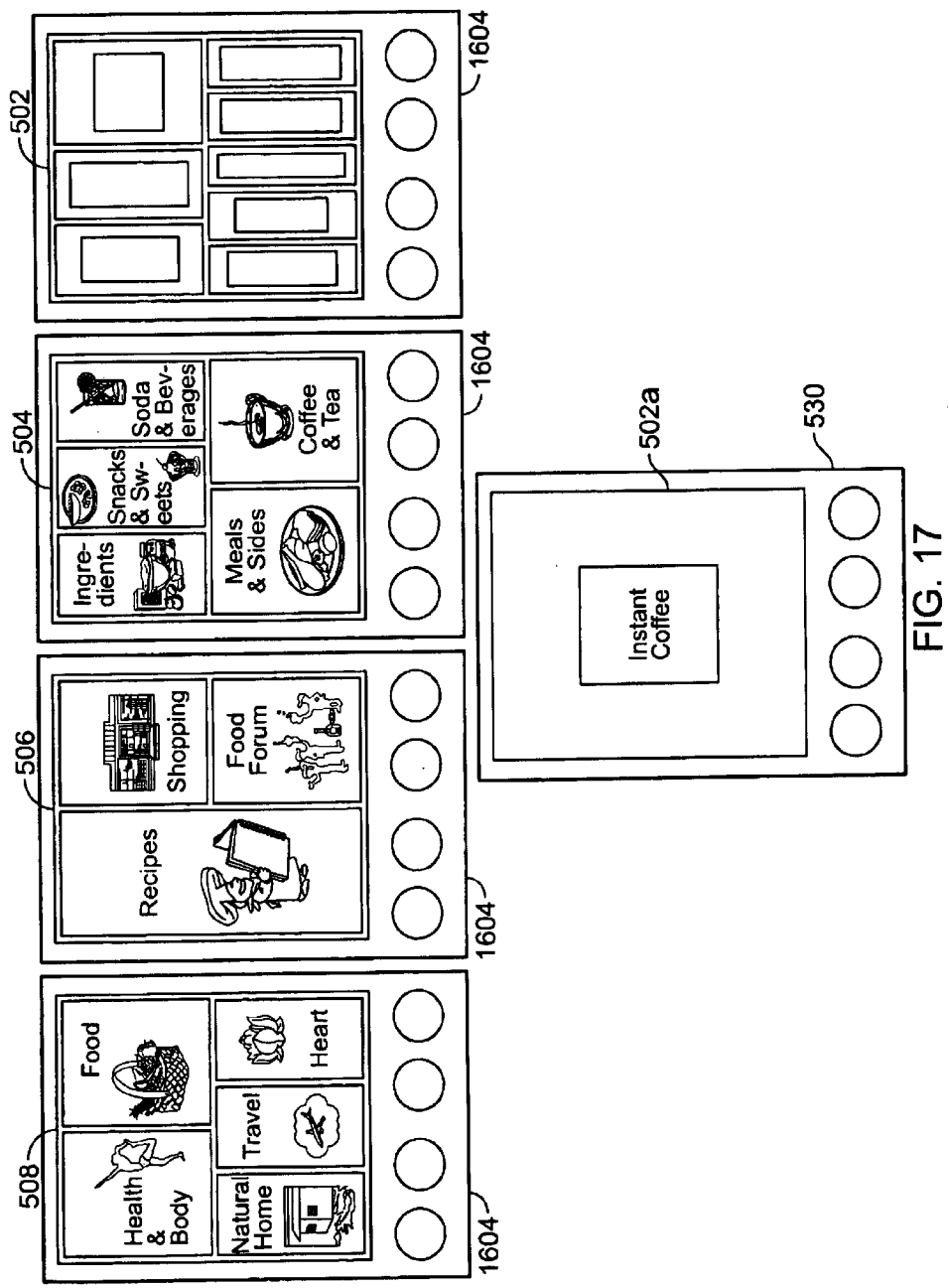
FIG. 17 depicts illustrative display images of user viewing perspectives as rendered by a PDA in accordance with an embodiment of the invention.

FIG. 16 is a conceptual block diagram 1600 depicting a database server 1602 in communication with a PDA 1604 which is Zoom Enabled™ in accord with an illustrative embodiment of the invention. The database server 1602 contains the data objects 1606a–1606f stored in the SZML™ format. The database server 1602 first transmits the data object for the home screen 1612 via the communication channel 1608. As described above with regard to the downloading and compression, the data objects 1606a–1606f that are in the closest vicinity of the home screen in the spatial hierarchical relationship are downloaded next. The PDA 1604 has a small memory 1610 that can hold, for example, fifty kilobytes of information. Since the SZML™ formatted data objects 1606a–1606f are compact, the small memory cache 1610 can hold, for example, about one hundred SZML data objects. Illustratively, FIG. 17 depicts the graphic appearances 502–506 and 502a of FIG. 5 rendered on the PDA 1604. As depicted, the user navigates through the data objects and through the same hierarchical levels (e.g., screens), regardless of the client device 114.

Figure 18:
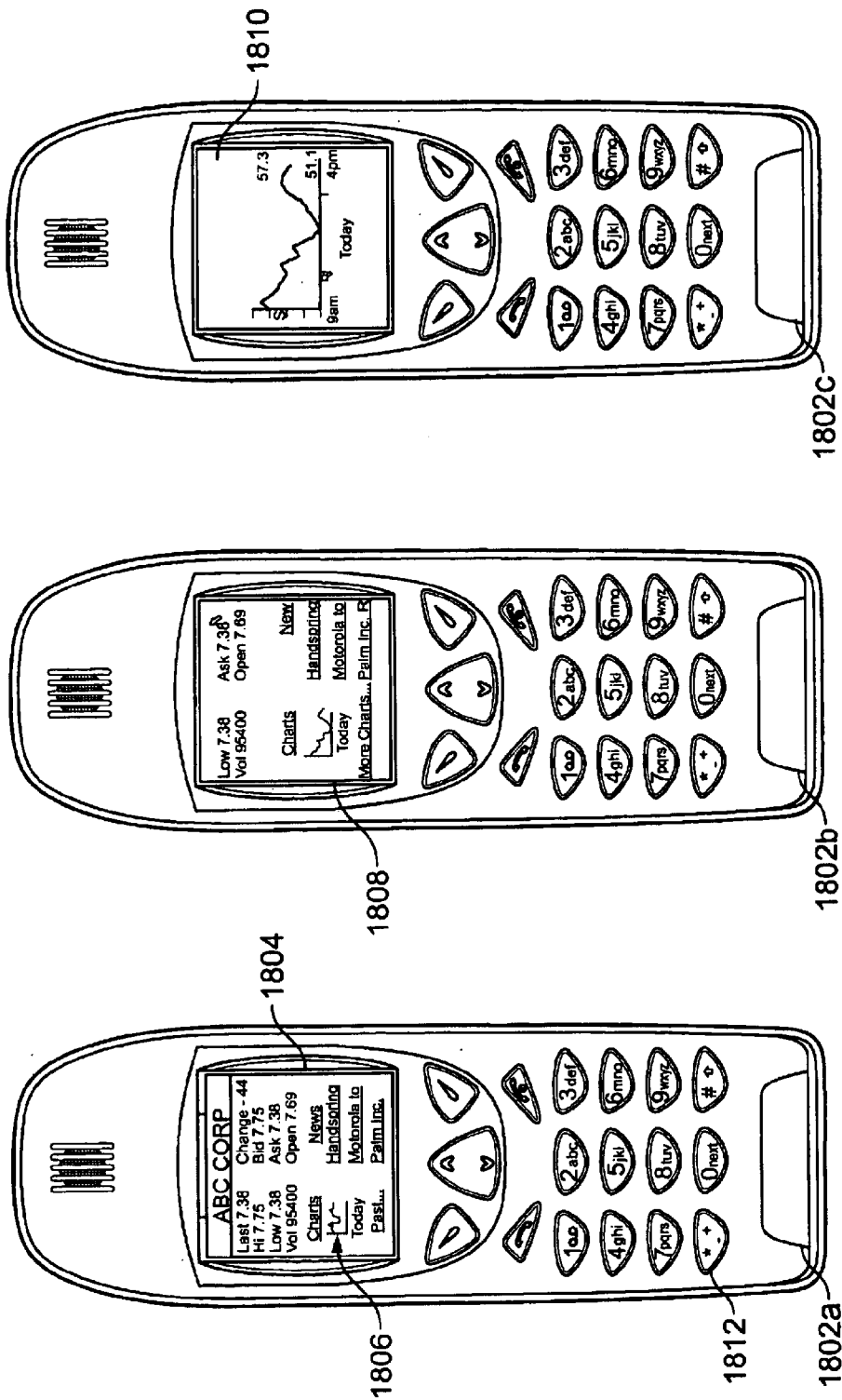
FIG. 18 depicts illustrative display images of user viewing perspectives as rendered by a wireless telephone in accordance with an embodiment of the invention.

Since the ZML™ and SZML™ data can be lightweight (e.g., quick transmission and low memory requirements) using some of the compression/conversion algorithms, wireless telephony devices are applicable clients for the system 100. FIG. 18 illustrates the telephony device 1802 displaying the SZML™ data objects 1804, 1808 and 1810 at three discrete time intervals 1802a, 1802b, and 1802c, respectively. The telephony device 1802 displays the data objects 1804, 1808 and 1810 using a financial template and the linear expansion and contraction algorithm described above. The telephony device initially 1802a displays a graphic appearance 1804 of financial information for ABC Corp. The screen 1804 has a 'click-region' 1806 to expand the displayed chart to reveal to the user more detail of the chart. As described with SZML, the telephony device subsequently 1802b employs the above discussed linear expansion technique to provide the user with the graphic appearance 1808 and the feeling of zooming through the home graphic appearance 1804 to the zoom_to screen 1810. The telephony device then 1802c depicts the zoom_to screen 1810 at its normal state (i.e., 100%).

The user can virtually zoom through the data objects using the keypad 1812 of the telephony device 1802. In another embodiment, the user uses a CellZoomPad™ ("CZP"). The CZP™ device is a clip-on device for the wireless telephony device 1802. The CZP™ device turns the wireless telephony screen into a touch pad, similar to those found on portable PCs. Moving around the pad performs the zooming.

FIG. 19 illustrates the use of a kiosk 1900. The illustrative kiosk 1900 is adapted for less technical users who are on the move, such as travelers passing through an airport. Because the virtual, multi-dimensional space 110, by its nature, creates a multi-dimensional display area, the appearances can have selection areas or buttons that the user can then virtually zoom into for more detail.

By way of example, the kiosk 1900 presents the user with the graphic appearance 1902. The graphic appearance 1902 has five options laid out like the fingers of a hand 1906. The graphic appearance 1902 represents a home level where the user can find out about transportation 1904a, accommodations 1904b, food 1904c, city information 1904d and airport information 1904e. Similar to the retail paradigm depicted in FIG. 5, the user can navigate through screens, which break information into categories, until desired products or services are displayed. For example, the graphic appearance 1908 shows hotels 1910a–1910c in the Boston area, displayed by system 100, in response to the user selecting the accommodations appearance 1904b.

In response to the user choosing, for example, the Four Seasons™ Hotel appearance 1910c, the system 100 displays the screen 1916, which provides the user with five selections 1912a–1912e that are ergonomically arranged in the pattern of a hand 1914. The five selections enable the user to download 1912a hotel information to a handheld, display pictures of the hotel 1912b, display details regarding hotel facilities 1912c, obtain the hotel address 1912d, and/or make reservations 1912e.

In response to the user selecting to download to a PDA 1912a, the system 100 displays the graphic appearance 1918. The graphic appearance 1918 directs the user to put the PDA in front of a synchronization port to download the information. Illustratively, the system 100 downloads the selected information using an IR data transfer over a short-range wireless communication channel 1920. In another embodiment, the user places the PDA in a cradle 1922 to create a physical communication channel to download the data. In another embodiment, the information is transferred via a long-range wireless communication channel 1924, such as a wireless telephone network. Kiosks such as the kiosk 1900 can be located anywhere a display can be placed. For example, displays can be placed on walls or on stand alone terminals throughout airports, train stations, bus stations, hotels, museums, stores, office buildings, outdoor locations, and the like. The kiosks 1900 can perform their own processing, or be tied to a remote server that services user requests and data transfers. In another embodiment, the kiosk does not contain a display. The kiosk only includes a transmitter (e.g., an IR transmitter) that sends targeted information to a user's client as the user travels within a close vicinity of the kiosk transmitter, whether or not the user requests data.

For example, a woman exits a plane at a Boston airport and uses a kiosk 1900 to determine which hotel (e.g., graphic appearances 1902 and 1908) and restaurant to use for her stay. Then she takes action on the kiosk 1900 to transfer the information (e.g., graphic appearances 1916 and 1918) for the hotel and restaurant into her PDA. In a hurry, she gets in a cab, and while in the cab reviews her selections to confirm price and location.

According to one embodiment, each zoom system at its lowest level is represented by a compact (potentially human readable) format such as the ZML™ format. This language is independent of platform and products. According to a further feature during the information transfer between devices, only the ZML™ formatted data needs be transferred. Additionally, users may choose to download all or some of the ZML™ formatted information. For example, the woman at the airport can choose to download one restaurant, download one type of restaurant such as Greek, download all restaurants, or download the entire database for the city. As discussed with respect to FIG. 16, with SZML™ formatted data objects, about one hundred screens could be loaded into the PDA cache 1610, which creates a large number of downloading options for the user.

Figure 20:
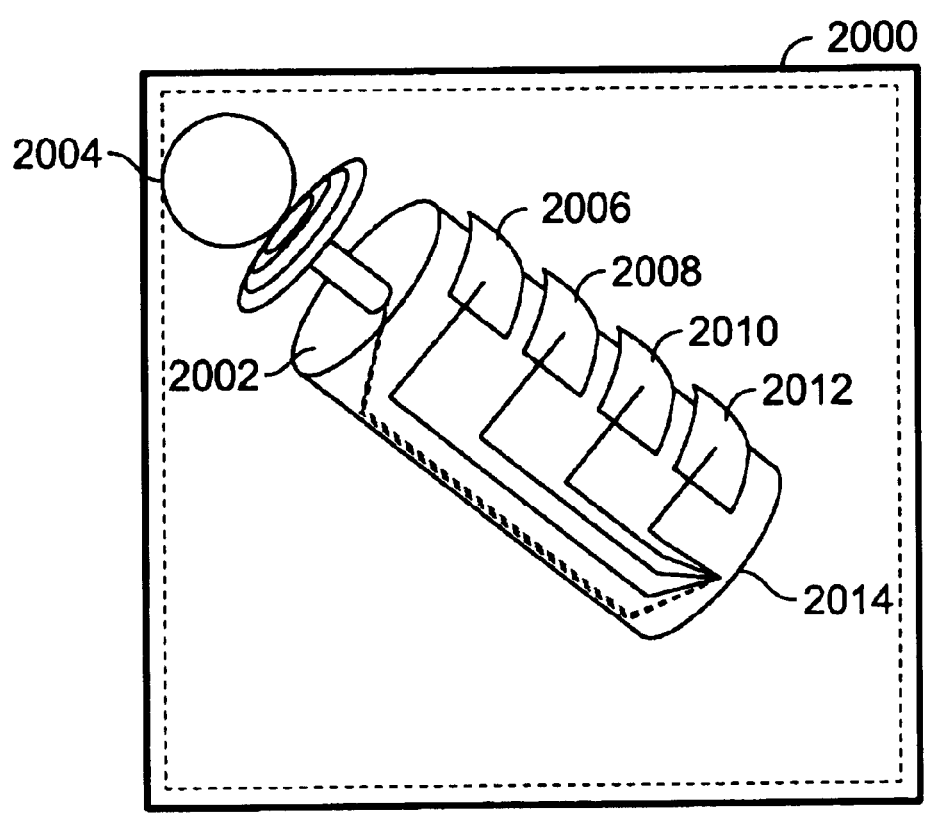
FIG. 20 depicts a hand-held device enabling the user to control the viewing perspective in accordance with an embodiment of the invention.

Referring to FIG. 20, another device that can be used as a user control 107 in conjunction with the system 100 is a handheld navigation device 2000. In one embodiment, the navigation device 2000 is wireless. The device 2000 is a handheld joystick-like device that is custom tailored for browsing in virtual space 110. The device 2000 can be used across various platforms and clients, for example, personal computer and television. The device 2000 has an analog three-dimensional joystick 2002, with a loop 2004 on the top. In response to the user actuating the joystick north, south, east or west, the system 100 pans. In response to the user pushing in or pulling out on the loop 2004 the system 100 zooms. Optionally, the user can rotate the joystick 2002 to effectuate virtual rotational movement. Four buttons 2006–2012 can provide standard mouse functions, custom functions and/or redundant zooming functions. For example, the functions of the buttons can be to cause the system 100 to take a snapshot of the virtual location of the viewing perspective, or a snapshot of the history (e.g., breadcrumb trail) of the user's trajectory. Other examples of functions can include purchasing an item, sending an email, synchronizing data to or from the client, transmitting information to or from a client device, recording music, and signaling an alarm (e.g., causing a system to dial 911). An Infrared Sensor 2014 option replaces a wired connection. Additionally, the device 2000 can be configured to vibrate in relation to user virtual movement, to provide tactical feedback to the user. This feedback can be in synchronization with the user's virtual movements through the multi-dimensional Zoom Space™ 110 to give the user an improved sensory enriching experience. In another embodiment, the device 2000 has a speaker and/or a microphone to give and/or receive audio signals for interaction with the system 100.

Other enhancements to the system 100 include using voice recognition. According to one embodiment, the user can speak all of the available system commands, such as, "zoom in", "zoom out", "pan left", select <object> where <object> is a word(s) in a database. In further embodiments, the system 100 produces sounds, including music, smells, and/or tactile vibrations to provide the user width additional sensory cues to relate the virtual state of the system with the selected physical paradigm. In an embodiment with sound, the system 100 coordinates the sound with the zooming to enhance further the virtual three-dimensional effect. For example, the closer the user virtually navigates to a data object, the louder the sound of that data object becomes. As the user zooms into a map of a city, the closer to the street detail the user gets, the louder the street noise becomes. The sound can also be coordinated with what hierarchical level the user is on. For example, when on a street of a city, the user hears typical street noises associated with that location. As the user zooms into a restaurant on that street, the sounds change from the street noises to typical restaurant sounds associated with that particular restaurant. As the user zooms in for more restaurant detail, the restaurant sounds get louder, as discussed above.

Similarly, in another embodiment, the user navigates through data objects that represent music. As a user navigates at a higher hierarchical level, such as categories of music (e.g., jazz, rock, latino), the system 100 plays to the user representative music of that category. Likewise, as a user navigates to a lower hierarchical level, such as specific performers, the system 100 plays representative music of that performer. As the user navigates to a lower hierarchical level, such as songs from a specific performer, the system 100 plays the song corresponding to the nearest data object. As the user navigates closer to that data object, the song gets louder.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for locating data objects in virtual location space, said method comprising:

extracting a plurality of data objects from a data source, determining a relationship between said plurality of data objects, said relationship being based, at least in part, on a spatial paradigm, and locating each of said plurality of data objects at a respective location within a virtual location space, such locating being based, at least in part, on said spatial paradigm, said virtual location space including a first dimension, a second dimension, and a third dimension, said first dimension corresponding to a plurality of planes within the virtual location space at which a data object can be located and said second and said third dimensions corresponding to a position of a data object within a plane, wherein said locating comprises assigning to each of said plurality of data objects a value for each of said three dimensions, based, at least in part, on a template relating to said spatial paradigm, thereby determining said respective location of each of said plurality of data objects in said virtual location space, and wherein a first one of said plurality of data objects is located on a plane different from a second one of said plurality of data objects.

2. The method of claim 1 further comprising displaying from an adjustable viewing perspective of said user an appearance of a subset of said plurality of data objects in a virtual representation.

3. The method of claim 1, further comprising,
comparing each of said plurality of data objects to a predetermined criterion, and
establishing a hierarchical relationship between said data objects based in part on said comparison.

4. The method of claim 3 further comprising organizing said data objects in a node tree.

5. The method of claim 3 wherein said predetermined criterion includes content type.

6. The method of claim 5 wherein said content type includes at least one of images, text, links, sounds, vector graphics, movies, executables, HTML elements, tables and frames.

7. The method of claim 3, in which said data source is a Web page, and wherein establishing said hierarchical relationship further comprises,
receiving source code corresponding to said Web page, wherein each of said plurality of data objects is an element of said source code, and
determining said hierarchical relationship between said plurality of data objects based, at least in part, on a display font size value of each of said data objects.

8. The method of claim 3, in which said data source is a Web page, and wherein establishing said hierarchical relationship further comprises,
receiving source code corresponding to said Web page, wherein each of said plurality of data objects is an element of said source code, and
determining said hierarchical relationship between said plurality of data objects based, at least in part, on a display location value of each of said data objects.

9. The method of claim 1 wherein locating further comprises,
defining a hierarchical node tree corresponding to said virtual location space, and
assigning each of said data objects to a node in said hierarchical node tree, based, at least in part, on a template relating to said spatial paradigm, thereby determining said respective location of each data object in said virtual location space.

10. The method of claim 1 wherein said data source is an edge server.

11. The method of claim 1 further comprising converting said located data objects to be compatible with a platform.

12. The method of claim 11 wherein said platform is associated with a mobile device.

13. The method of claim 12 wherein said mobile device comprises a PDA, a watch display, or a telephone.

14. The method of claim 11 wherein said platform is compatible with JAVA, a PALM operating system, a POCKET PC operating system or a SYMBIAN operating system.

15. The method of claim 11 wherein said deliverable format is compatible with Wireless Application Protocol (WAP), HyperText Markup Language (HTML), Graphics Interchange Format (GIF), Zoomable Markup Language (ZML), or Macromedia FLASH.

16. The method of claim 1 further comprising converting said located data objects to a deliverable format.

17. The method of claim 1 wherein each of said data objects corresponds to a respective one of a plurality of abstraction levels, wherein determining said relationship further comprises determining said relationship between said plurality of data objects, said relationship including a plurality of hierarchical levels and being based, at least in part, on a correspondence between equivalent abstraction levels being associated with equivalent hierarchical levels.

18. The method of claim 17 wherein locating further comprises locating each of said plurality of data objects at a respective location within a virtual location space, said location corresponding to one of said hierarchical levels, the method further comprising,
displaying a set of said data objects corresponding to a first hierarchical level.

19. The method of claim 1 wherein locating further comprises locating each of said plurality of data objects within said virtual space using Cartesian coordinates corresponding to said three dimensions.

20. The method of claim 1 further comprising:
enabling a user to navigate said data objects in a substantially unrestricted fashion using a pan control, a zoom-in control, and a zoom-out control.

21. The method of claim 20 wherein enabling further comprises generating an appearance to the user of a virtual mass while navigating said data objects.

22. The method of claim 20 wherein, with respect to a hierarchical level of a current data object, said pan control enables navigation to another data object located at a hierarchical level of said current data object, said zoom-in control enables navigation to another data object at another hierarchical level that is a child to said hierarchical level of said current data object, and said zoom-out control enables navigation to another data object at another hierarchical level that is a parent to said hierarchical level of said current data object.

23. The method of claim 20 wherein, said pan control enables navigation along the second and the third dimensions, and said zoom-in control and said zoom-out control enables navigation along the third dimension.

24. A system for locating data objects in virtual space, said system comprising:
a computing device adapted to extract a plurality of data objects from a data source, and to locate each of said plurality of data objects at a respective location within a virtual location space, such locating being based, at least in part, on said spatial paradigm, said virtual location space including a first dimension, a second dimension, and a third dimension, said first dimension corresponding to a plurality of planes within the virtual location space at which a data object can be located and said second and said third dimensions corresponding to a position of a data object within a plane, wherein said locating comprises assigning to each of said plurality of data objects a value for each of said three dimensions, based, at least in part, on a template relating to said spatial paradigm, thereby determining said respective location of each of said plurality of data objects in said virtual location space, and wherein a first one of said plurality of data objects is located on a plane different from a second one of said plurality of data objects.

25. The system of claim 24 further adapted to display from an adjustable viewing perspective of said user an appearance of a subset of said plurality of data objects in a virtual representation.

26. The system of claim 24 further adapted to compare each of said plurality of data objects to a predetermined criterion, and to establish a hierarchical relationship between said data objects based in part on said comparison.

27. The system of claim 26 further adapted to organize said data objects in a node tree.

28. The system of claim 26 said predetermined criterion includes content type.

29. The system of claim 28, wherein said content type includes at least one of images, text, links, sounds, vector graphics, movies, executables, HTML elements, tables and frame.

30. The system of claim 26, in which said data source is a Web page, further adapted to receive source code corresponding to said Web page, wherein each of said data objects is an element of said source code, and to determine said hierarchical relationship between said plurality of data objects based, at least in part, on a display font size value of each said data objects.

31. The system of claim 26, in which said data source is a Web page, further adapted to receive source code corresponding to said Web page, wherein each of said plurality of data objects is an element of said source code, and to determine said hierarchical relationship between said plurality of data objects based, at least in part, on a display location value of each said data objects.

32. The system of claim 24, further adapted to define a hierarchical node tree corresponding to said virtual location space, and to assign each of said data objects to a node in said hierarchical node tree, based, at least in part, on a template relating to said spatial paradigm, thereby determining said respective location of each data object in said virtual location space.

33. The system of claim 24 wherein said data source is an edge server.

* * * * *